United States Patent

Sakakibara et al.

Patent Number: 5,161,433
Date of Patent: Nov. 10, 1992

[54] APPARATUS FOR CONTROLLING A CONTINUOUSLY VARIABLE TRANSMISSION

[75] Inventors: Shiro Sakakibara, Anjo; Akihiro Kume, Aichi, both of Japan

[73] Assignee: Aisin AW Co., Ltd., Japan

[21] Appl. No.: 633,356

[22] Filed: Dec. 27, 1990

[30] Foreign Application Priority Data

Dec. 29, 1989 [JP] Japan .................................. 1-341518

[51] Int. Cl.⁵ .............................................. B60K 41/12
[52] U.S. Cl. ................................ 74/866; 364/424.1; 474/18
[58] Field of Search ............... 74/866; 364/424.1; 474/18, 28, 11

[56] References Cited

U.S. PATENT DOCUMENTS

| | | | |
|---|---|---|---|
| 4,589,071 | 5/1986 | Yamamuro et al. | 364/424.1 |
| 4,590,561 | 5/1986 | Abo et al. | 364/424.1 |
| 4,649,485 | 3/1987 | Osanai et al. | 74/866 X |
| 4,872,115 | 10/1989 | Itoh et al. | 364/424.1 |
| 4,890,516 | 1/1990 | Suzuki | 74/866 |
| 4,949,596 | 8/1990 | Iino et al. | 74/866 |
| 4,956,972 | 9/1990 | Sasajima et al. | 74/866 X |
| 5,001,900 | 3/1991 | Sasajima et al. | 364/424.1 X |
| 5,009,127 | 4/1991 | Morimoto et al. | 74/866 |
| 5,009,129 | 4/1991 | Morimoto et al. | 364/424.1 X |
| 5,012,697 | 5/1991 | Yamashita et al. | 364/424.1 X |
| 5,020,392 | 6/1991 | Morimoto | 74/866 |
| 5,050,455 | 9/1991 | Yamashita et al. | 74/866 |
| 5,073,859 | 12/1991 | Suzuki | 364/424.1 |
| 5,075,860 | 12/1991 | Suzuki | 364/424.1 |

Primary Examiner—Rodney H. Bonck
Assistant Examiner—Khoi Q. Ta
Attorney, Agent, or Firm—Lorusso & Loud

[57] ABSTRACT

Disclosed is an apparatus for controlling a continuously variable transmission for controlling a speed-change ratio so as to set an input number of revolutions of the continuously variable transmission mounted on a vehicle to a predetermined targeted value on the basis of engine performance at a predetermined throttle opening. The apparatus has a device for imparting an initial value of a range of the targeted value when a change in the throttle opening ceases and a device for changing the range of the targeted value when there is no change in the throttle opening. A range between the upper and lower limits of a targeted engine speed is rendered variable depending on the driver's requirements and the running state, making it possible to properly determine which of the characteristics is to be strengthened among the power performance, fuel consumption performance, control stability, and transmission efficiency.

11 Claims, 19 Drawing Sheets

θ : THROTTLE OPENING
F : FLAG REPRESENTING A THROTTLE CHANGE
NH : RANGE BETWEEN UPPER AND LOWER LIMITS OF N*
NHO : INITIAL VALUE OF NH
ΔNH : INCREEMENT OF NH

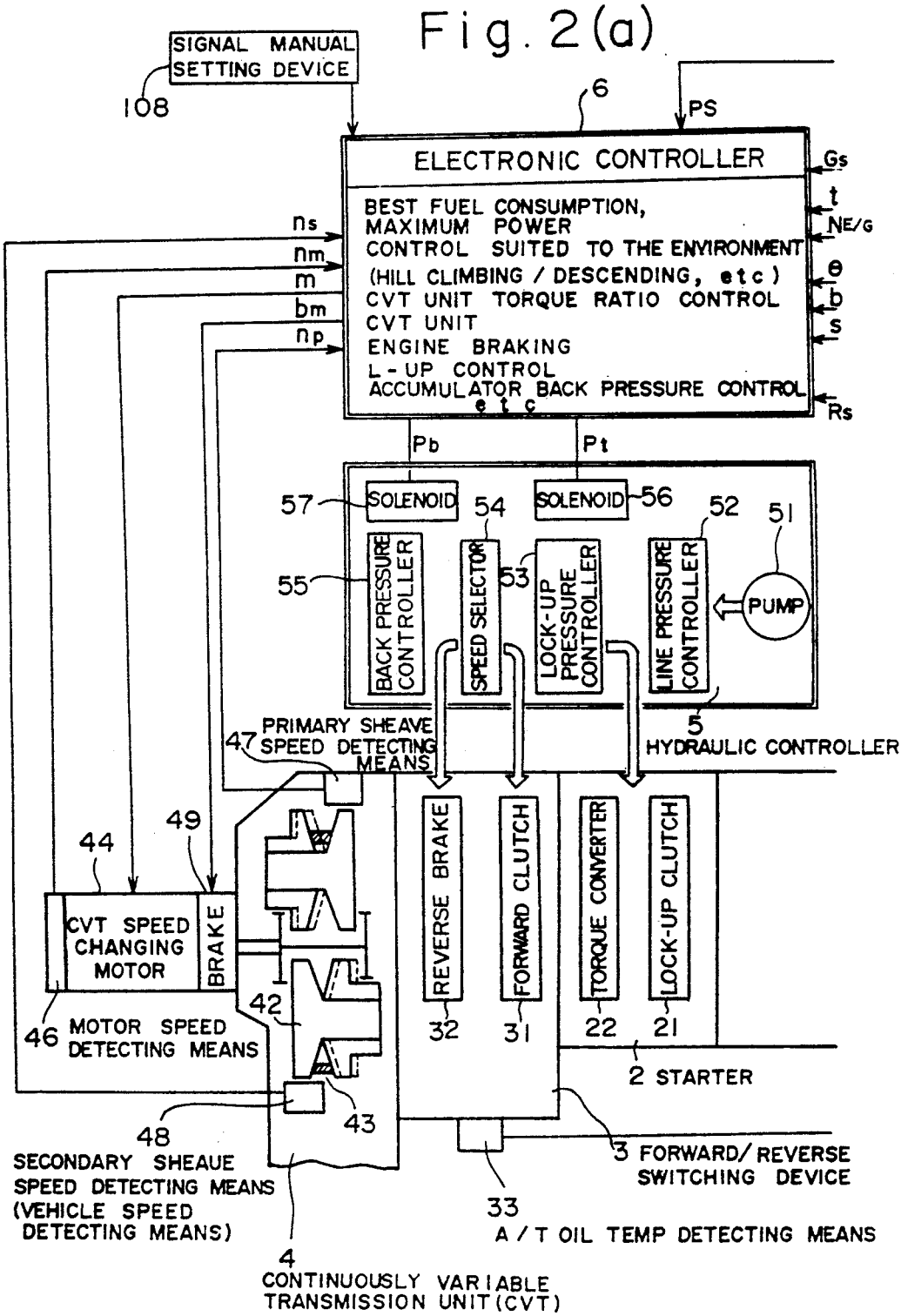

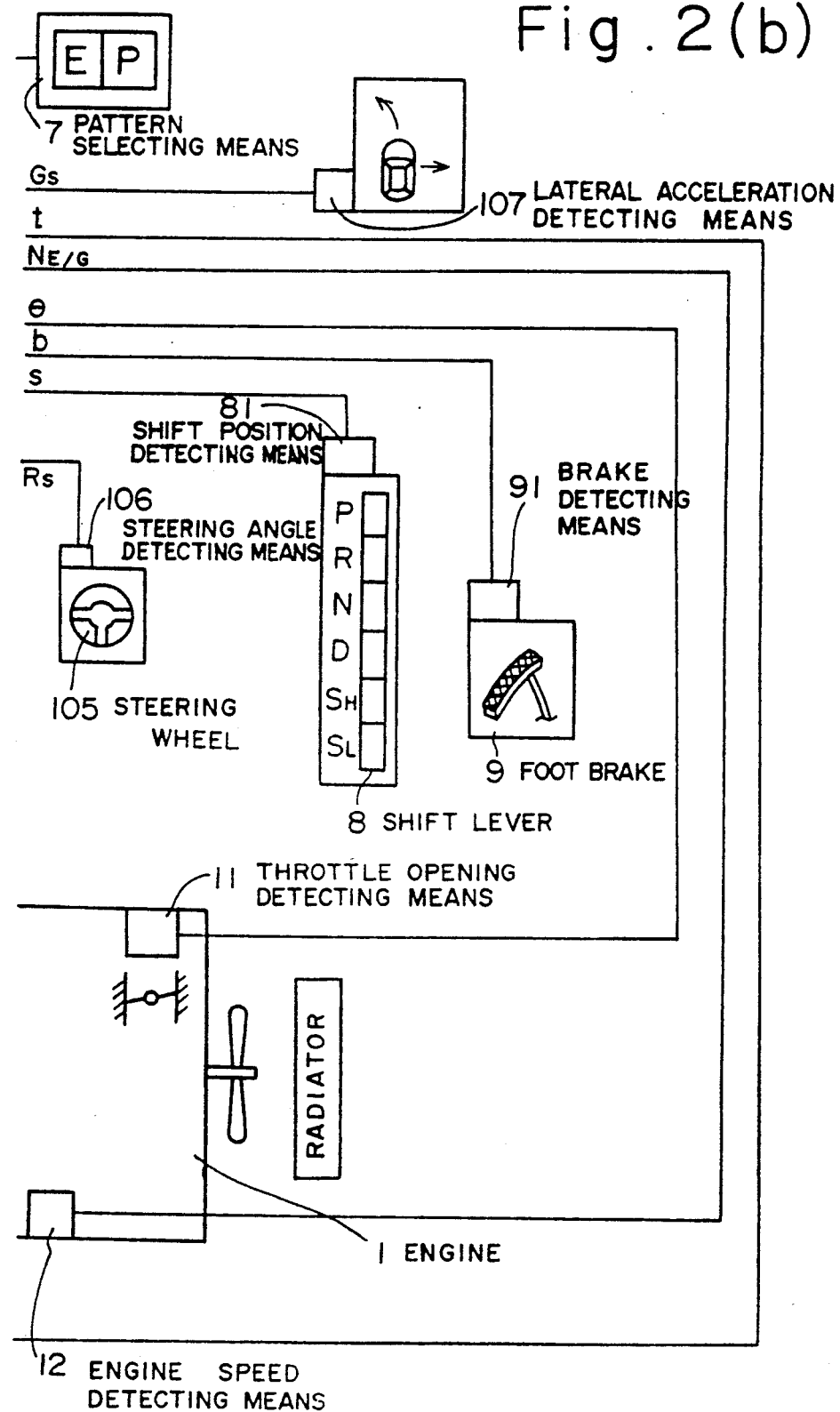

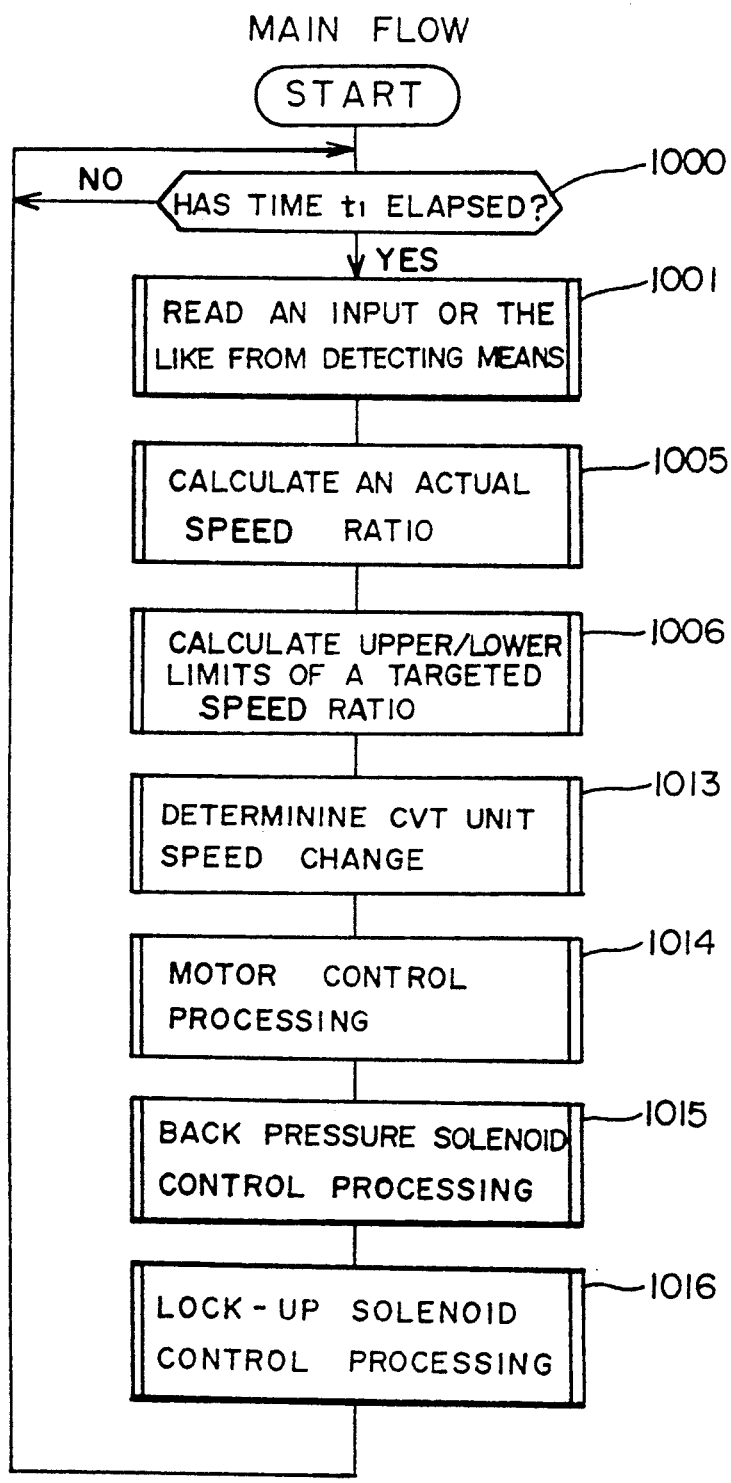

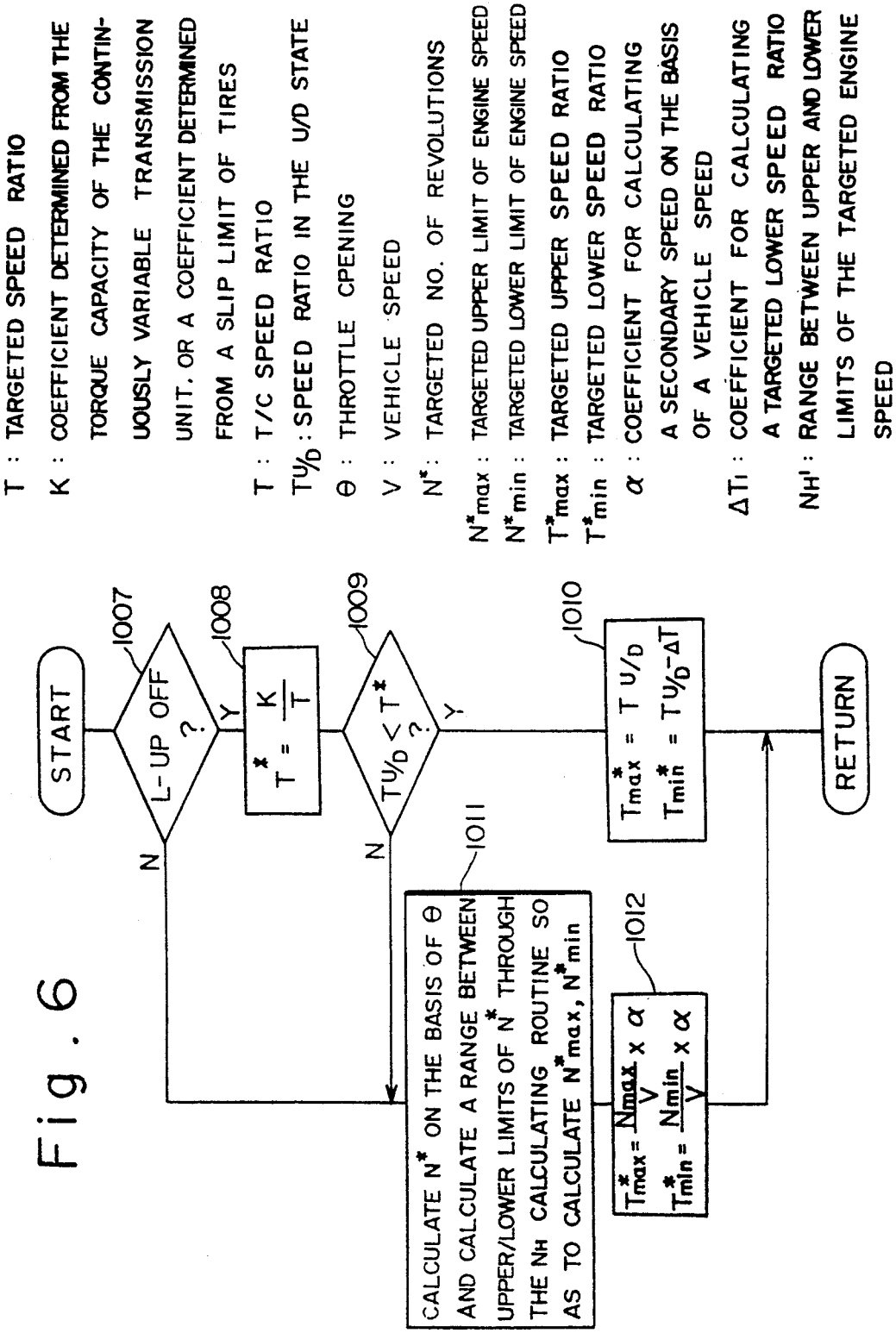

θ : THROTTLE OPENING

F : FLAG REPRESENTING A THROTTLE CHANGE

NH : RANGE BETWEEN UPPER AND LOWER LIMITS OF $N^*$

NHO : INITIAL VALUE OF NH

ΔNH : INCREEMENT OF NH

Fig. 14(a)
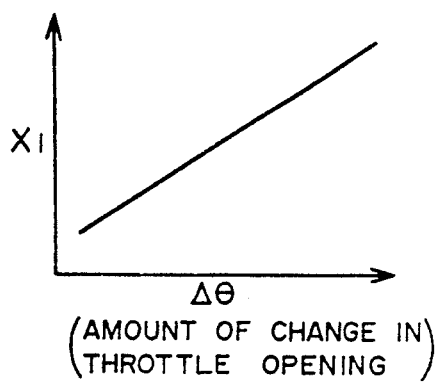
(AMOUNT OF CHANGE IN THROTTLE OPENING)
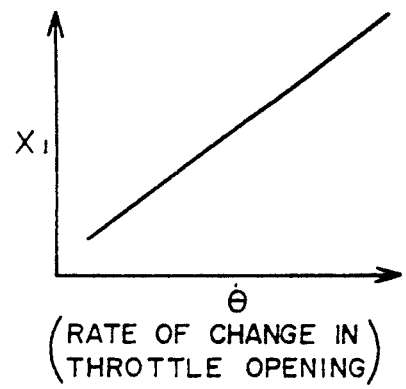
(RATE OF CHANGE IN THROTTLE OPENING)
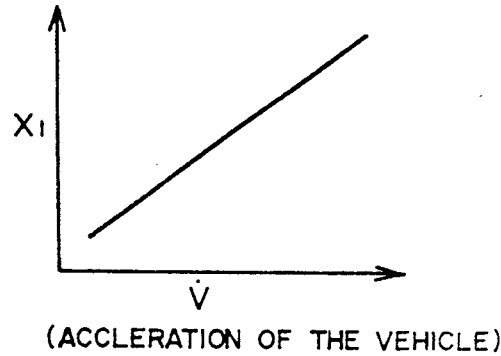
(ACCLERATION OF THE VEHICLE)
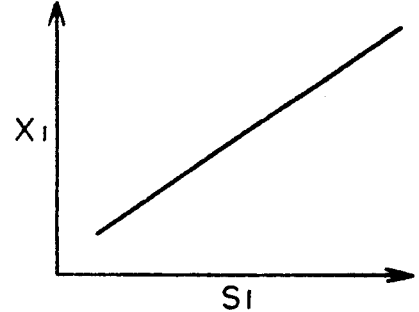
(MANUALLY SET SIGNAL FOR REQUESTING A CHANGE IN THE RUNNING STATE OF THE VEHICLE)

Fig.14(b)
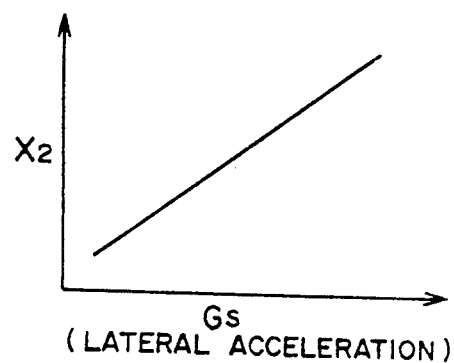
Gs (LATERAL ACCELERATION)
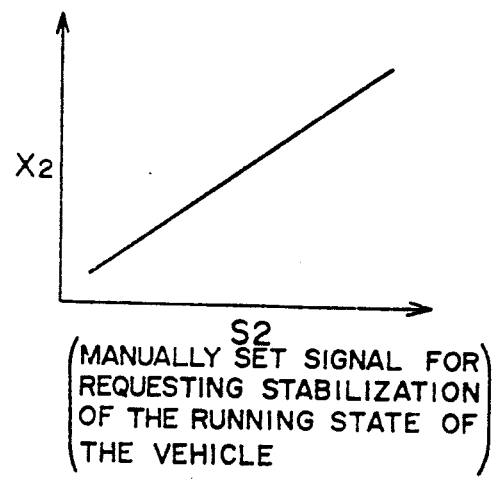
S2 (MANUALLY SET SIGNAL FOR REQUESTING STABILIZATION OF THE RUNNING STATE OF THE VEHICLE)
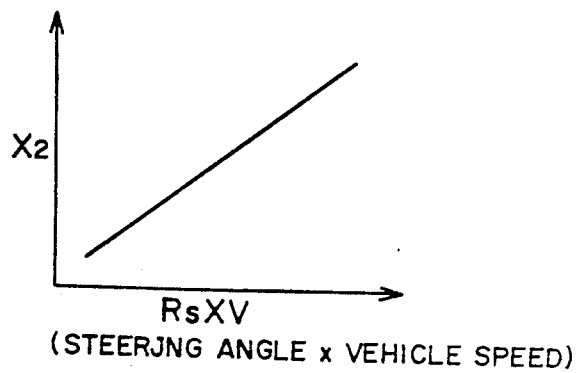
RsXV (STEERJNG ANGLE x VEHICLE SPEED)

Fig. 16
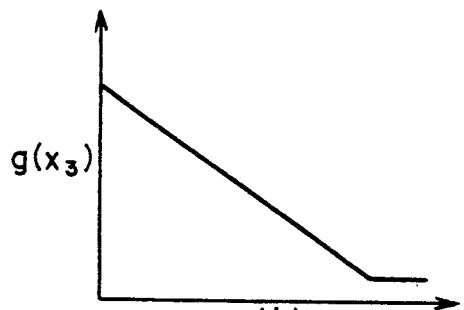
$X_3 = |\dot{V}|$
(ACCELERATION OF THE VEHICLE)
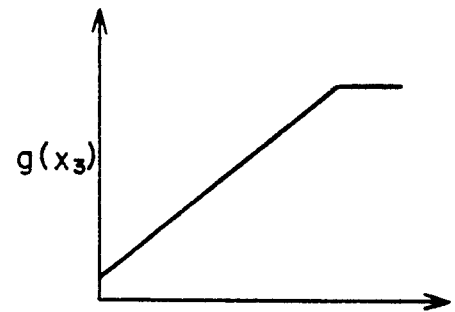
$X_3 = G_S$
(LATERAL ACCELERATION)
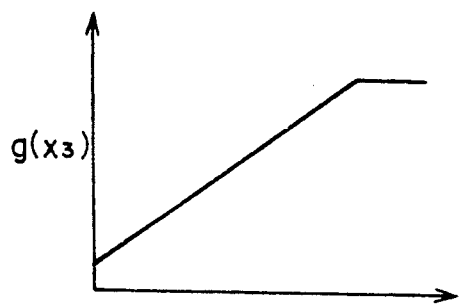
$X_3 = t_\theta$
(UNCHANGED DURATION OF $\theta$)
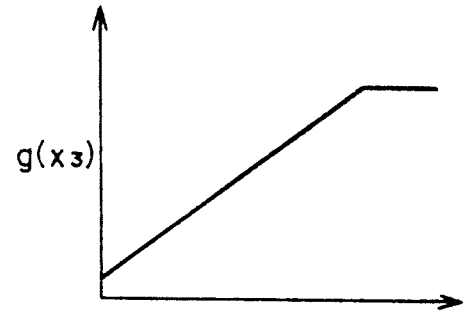
$X_3 = t_V$
(UNCHANGED DURATION OF VELOCITY)
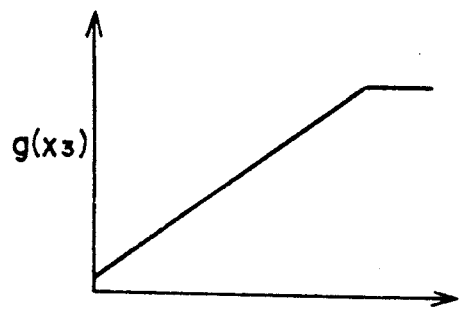
$X_3 = S_2$
(MANUALLY SET SIGNAL FOR REQUESTING STABILIZATION OF THE RUNNING STATE OF THE VEHICLE)

APPARATUS FOR CONTROLLING A CONTINUOUSLY VARIABLE TRANSMISSION

BACKGROUND OF THE INVENTION

1. Field of the Invention

The present invention relates to an apparatus for controlling a continuously variable transmission and, more particularly, to a for controlling a range between upper and lower limits of a targeted speed of an engine, a continuously variable transmission in accordance with the running state of the vehicle, the driver's requirements, preferences, feelings, and so on.

2. Description of the Related Art

Conventionally, in the speed-change control of a continuously variable transmission mounted on a vehicle, a targeted value of an engine speed which is an input speed for the transmission, i.e., a targeted engine speed, is set on the basis of the engine performance. Upper and lower limits of the targeted engine speed are set centering on that value so as to stabilize control. Also, the number of speed changes is reduced so as to prevent a decline in the transmission efficiency during a speed change. This point can be understood from FIG. 17, a time t is plotted as the abscissa, and an engine speed $N_{E/G}$ is plotted as the ordinate. For instance, in the case of controlling the engine speed $N_{E/G}$ toward a targeted engine speed $N^*$ set on the basis of the maximum power curve of the engine, unless upper and lower limits are set for the targeted engine speed, the speed change is repeated frequently in the vicinity of the targeted engine speed $N^*$, as shown by the dotted line in the drawing so as to bring the engine speed $N_{E/G}$ toward the targeted engine speed $N^*$. Accordingly, the speed-change control becomes unstable, and the transmission efficiency of the transmission declines during the speed changes. To cope with this situation, if upper and lower limits $N^*_{max}$ and $N^*_{min}$ are provided for the targeted engine speed $N^*$, the number of speed changes decreases as shown by the solid line in the drawing, control becomes stable, and it is possible to prevent a decline in the transmission efficiency during the speed changes. Thus, by providing $N^*_{max}$ and $N^*_{min}$, the speed change is suspended when the engine speed $N_{E/G}$ reaches $N^*$, and the speed change is not effected during $N^*_{min} < N_{E/G} < N^*_{max}$ so as to secure control stability and prevent the decline in transmission efficiency during speed changes.

However, as a method of determining a range between the upper and lower limits of the targeted engine speed, $N_H = N^*_{max} - N^*_{min}$, if $N_H$ is made large, the number of speed changes decreases and it is possible to prevent the decline in transmission efficiency during speed changes, and stability of control improves. However, if $N_H$ is large, the difference between $N^*$ and $N_{E/G}$ becomes large, so that the power performance and fuel consumption performance (in a case where a best fuel consumption curve is selected) deteriorates. On the other hand, if $N_H$ is made small, control stability deteriorates, but since $N^*$ is traced faithfully, the power performance and fuel performance improve. Conventionally, the characteristics have been determined in a fixed manner by placing emphasis on either one of the above-described alternative methods. In either case, however, the above-described drawbacks have been experienced.

SUMMARY OF THE INVENTION

Accordingly, an object of the present invention is to provide an apparatus for controlling a continuously variable transmission selectively either in a first mode emphasizing power performance/fuel performance or in a second mode emphasizing stability, on the basis of the running state of a vehicle, the driver's requirements, preferences, feelings, and the like, and which is capable of changing a range $N_H$ between upper and lower limits $N^*_{max}$ and $N^*_{min}$ of a targeted engine speed $N^*$ in such a manner as to conform to the selected mode, thereby overcoming the above-described drawbacks of the conventional art.

To this end, with reference to FIGS. 13, 14, and 16, in accordance with the present invention there is provided an apparatus for controlling a continuously variable transmission for controlling a speed-change ratio so as to set an input number of revolutions of the continuously variable transmission mounted on a vehicle to a predetermined targeted value on the basis of engine performance at a predetermined throttle opening, the apparatus comprising: means (4) for imparting an initial value $N_{HO}$ of a range of the targeted value when a change in the throttle opening ceases (1); and means (7) for changing the range of the targeted value by an increment $\Delta N_H$ when there is no change in the throttle opening.

With the apparatus for controlling a continuously variable transmission thus arranged in accordance with the present invention, the initial value $N_{HO}$ of a range $N_H$ between the upper and lower limits of a targeted engine speed $N^*$ corresponding to respective values of a variable $x_1$ expressing a request for changing the running state of the vehicle and a variable $x_2$ expressing a request for stabilizing the running state of the vehicle is calculated by the aforementioned means (4) in accordance with the formula $N_{HO} = A_1 \cdot f(x_1, x_2)$. Then, an increment $\Delta N_H$ of the range between the upper and lower limits of the targeted input number of revolutions corresponding to the value of a variable $x_3$ which is determined by a change in the running state of the vehicle, an unchanged duration of an input signal, or a manually set signal is calculated by the aforementioned means (7) on the basis of the formula $\Delta N_H = A_1 \cdot g(x_3)$. Accordingly, the initial value $N_{HO}$ calculated by the means (4) can be set in such a manner that the greater a request for change, the more narrowly the range of the initial value $N_{HO}$ is set, while the greater a request for stabilization, the more widely the range of the initial value $N_{HO}$ is set. Furthermore, when an actual input number of revolutions of the continuously variable transmission deviates from a targeted input number of revolutions thereof, if a decline of a characteristic required of an engine is large, the range of the targeted value is set narrowly, and even when the actual input number of revolutions of the continuously variable transmission deviates from the targeted input number of revolutions thereof, if the decline of the characteristic is small, the range of the targeted value is set widely. In addition, the increment $\Delta N_H$ calculated by the means (7) can be set in such a manner that the greater the request for change, the smaller the increment $\Delta N_H$ is set to be, whereas the greater the request for stabilization, the larger the increment $\Delta N_H$ is set to be. Furthermore, the longer the unchanged duration of the input signal, the greater the increment $\Delta N_H$ is set to be. Moreover, when the actual engine speed has deviated from the targeted engine speed, the increment $\Delta N_H$ is set to be small when a decline in a characteristic required of the engine is large, while the increment $\Delta N_H$ is set to be large when the decline in the characteristic in small even if the actual engine speed has so deviated. Thus, since the range between the upper and lower limits of the targeted engine speed is rendered variable depending on the driver's requirements ($\theta$, $\dot{\theta}$, $\Delta\theta$, etc.) and the running state by means of $x_1$, $x_2$, $x_3$, it is possible to properly determine which of the characteristics is to be strengthened among the power performance, fuel consumption performance, control stability, and transmission efficiency in the light of the driver's requirements and preference, as well as the running state of the vehicle and to effect adequate control.

In addition, since the range between the upper and lower limits of the targeted input number of revolutions is increased by means of the manually set signals $s_1$, $s_2$, it is possible to allow the continuously variable transmission to be operated in the manner of a nonvariable transmission. For instance, a feeling of acceleration can be obtained during acceleration through an increase in the engine speed.

It should be noted that in the foregoing description the reference numerals are employed for reference with the drawings, and should not be construed as restricting the arrangement of the present invention.

The above and other objects, features and advantages of the present invention will become more apparent from the following detailed description of the invention when read in conjunction with the accompanying drawings.

BRIEF DESCRIPTION OF THE DRAWINGS

FIGS. 2 (a-b) are system configuration diagrams of this embodiment;

FIG. 5 is a diagram illustrating the main flow of control using the electronic controller;

FIG. 6 is a flowchart for calculating upper and lower limits of a targeted torque ratio;

FIGS. 14 (a-b) are diagrams illustrating an example of a variable $x_1$ representing a request for changing a running state of a vehicle and a variable $x_2$ representing a request for stabilizing the state of running of the vehicle;

FIG. 16 is a set of graphs illustrating an example of a function g ($x_3$) and a variable $x_3$ determined by a change in the running state of the vehicle, an unchanged duration of an input signal, or a manually set signal.

DESCRIPTION OF THE PREFERRED EMBODIMENTS

Referring now to the accompanying drawings, a description will be given of the embodiments of the present invention.

Figure 1:
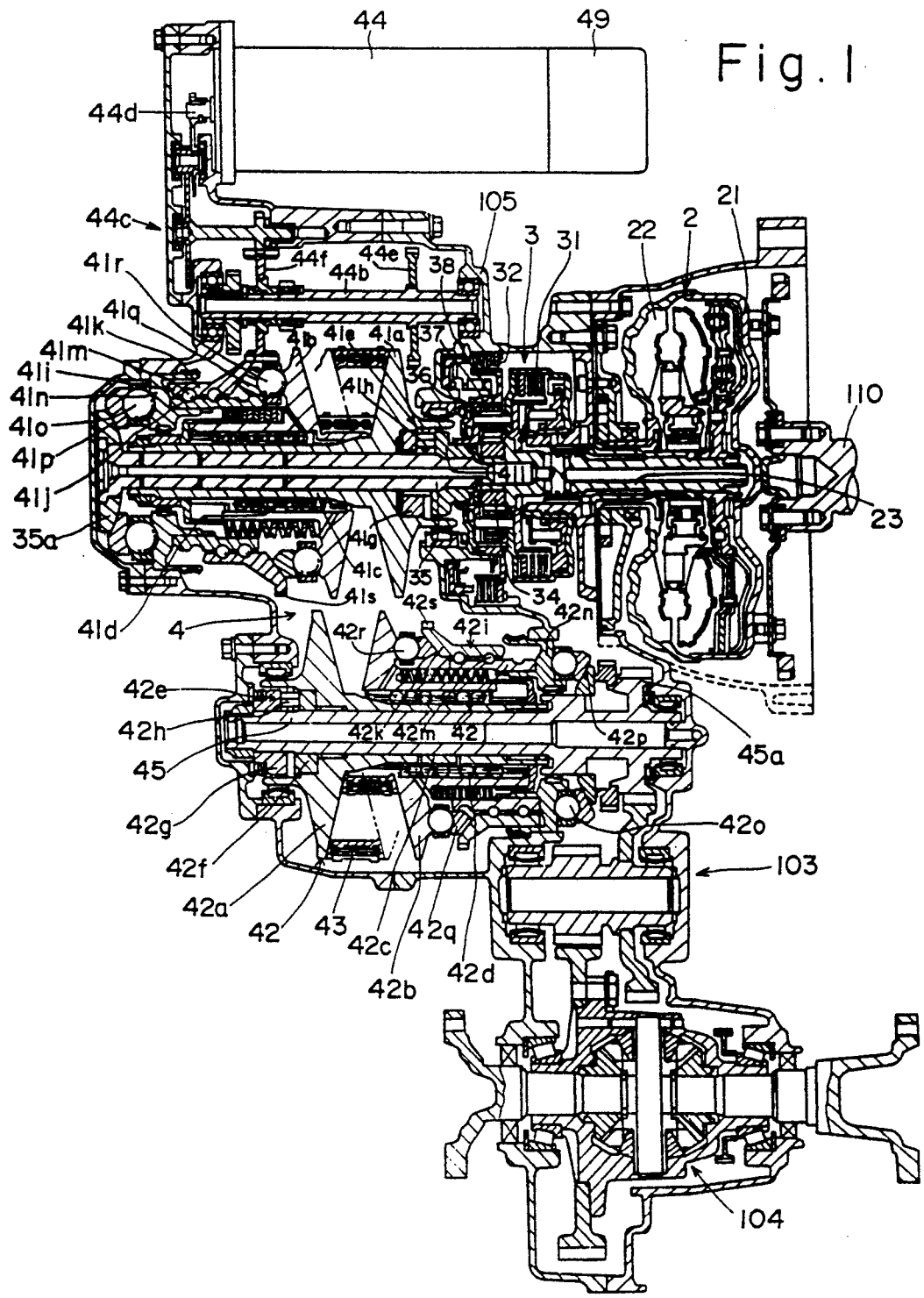
FIG. 1 is a cross-sectional view illustrating an example of a continuously variable transmission having a torque converter to which a first embodiment of an apparatus for controlling a continuously variable transmission in accordance with the present invention is applied.

FIG. 1 is a cross-sectional view illustrating an example of a V-belt type continuously variable transmission (CVT) having a torque converter to which a first embodiment of an apparatus for controlling a continuously variable transmission in accordance with the present invention is applied, and FIG. 2 is a system configuration diagram of this embodiment. In the drawings, reference numeral 1 denotes an engine; 2, a coupling mechanism; 3, a forward/reverse switching device; 4, a V-belt type continuously variable transmission unit; 5, a hydraulic controller; 6, an electronic controller; 7, a pattern selector; 8, a shift lever; and 9, a brake.

As shown in FIGS. 1 and 2, the coupling mechanism 2 is connected to the engine 1, and the V-belt type continuously variable transmission (CVT) unit 4 is connected to the coupling mechanism 2 via the forward/reverse switching device 3. This V-belt continuously variable transmission unit 4 is further connected to a differential gear mechanism 104 via a counter gear mechanism 103.

The engine 1 is provided with a throttle opening detecting means 11 and an engine speed detecting means 12. The throttle opening detecting means 11 and the engine speed detecting means 12 are respectively connected to the electronic controller 6, the former being adapted to output a throttle opening signal $\theta$ and the latter to output an engine speed signal $N_{E/G}$, respectively, to the electronic controller 6.

The starter coupling mechanism 2 comprises a torque converter 22 with a lock-up clutch 21. The pump side of the torque converter 22 is connected to an output shaft 110 of the engine 1, and the turbine side thereof is connected to an output shaft 23 of the torque converter 22. This output shaft 23 also serves as an input shaft for the forward/reverse switching device 3. The lock-up clutch 21 and the torque converter 22 are both adapted to be controlled by the hydraulic controller 5.

The forward/reverse switching device 3 comprises a sun gear 34, a carrier 36 connected to a primary shaft 35 of the forward/reverse switching device 3, a double pinion gear 37 supported by the carrier 36, and a ring gear 38 disposed in such a manner as to surround the double pinion gear 37. The forward/reverse switching device 3 further comprises a forward clutch 31 interposed between the torque converter output shaft 23 and the carrier 36 as well as a reverse brake 32 interposed between the ring gear 38 and a transmission case 105.

The forward clutch 31 and the reverse brake 32 are respectively adapted to be controlled by the hydraulic controller 5 to effect switching control for advancing and reversing.

Also, this forward/reverse switching device 3 is provided with an automatic transmission (A/T) oil temperature detecting means 33. The A/T oil temperature detecting means 33 is also connected to the electronic controller, and is adapted to output an oil temperature signal t representing the temperature of the hydraulic oil in the A/T to the electronic controller 6.

The V-belt type continuously variable transmission unit 4 is provided with a primary sheave 41, a secondary sheave 42, and a V-belt 43 wound around the sheaves 41, 42. The primary sheave 41 comprises a fixed sheave 41a and a movable sheave 41b. The fixed sheave 41a is supported by the primary shaft 35 in such a manner as to be relatively movable and relatively slidable in the axial direction with respect to the primary shaft 35. The movable sheave 41b is supported by a cylindrical portion 41c of the fixed sheave 41a in such a manner as to be movable in the axial direction only via a ball spline mechanism 41d. Similarly, the secondary sheave 42 comprises a fixed sheave 42a and a movable sheave 42b. The fixed sheave 42a is supported by an output shaft 45 of the V-belt continuously variable transmission unit 4 in such a manner as to be relatively movable and relatively slidable in the axial direction with respect to the output shaft 45. The fixed sheave 42b is supported by a cylindrical portion 42c of the fixed sheave 42a in such a manner as to be movable in the axial direction only via a ball spline mechanism 42d.

As for the primary sheave 41, a pressure-governing cam mechanism 41e is mounting on the primary shaft 35 interposed between the carrier 36, and the fixed sheave 41a. The pressure-governing cam mechanism 41e comprises an input-side cam 41f and an output-side cam 41g both having opposing surfaces thereof formed into a corrugated configuration, as well as a roller 41h interposed between the opposing surfaces of the cams 41f and 41g. The input-side cam 41f is spline connected to the carrier 36 and is screw connected to the primary shaft 35. Output-side cam 41g is spline fitted with the fixed sheave 41a, and a surface thereof which is remote from the surface coming into contact with the roller 41h abuts against a rear surface of the fixed sheave 41a via a disk spring.

In addition, a ball screw device 41i bears against a rear portion of the movable sheave 41b, and this ball screw device 41i comprises an externally threaded portion 41j, an internally threaded portion 41k, and a multiplicity of balls 41m disposed between thread grooves of the threaded portions 41j, 41k. The externally threaded portion 41j is supported by a flange 35a formed at an end of the primary shaft 35 via an adjustment member 41n, a bearing 41o, and a self-aligning mechanism 41p. The arrangement provided is such that the externally threaded portion 41j is rotated relative to the internally threaded portion 41k by rotating the adjustment member 41n so as to adjust the widthwise center of the primary sheave 41 at the time of adjustment of the initial tension of the belt 43 and during rotational movement of the belt. In addition, the internally threaded portion 41k is supported by the rear portion of the movable sheave 41b via a self-aligning mechanism 41q and a bearing 41r.

Accordingly, the torque transmitted to the input-side cam 41f via the carrier 36 and the primary shaft 35 is converted to an axial force corresponding to the magnitude of the transmitted torque by means of the pressure-governing cam mechanism 41e, and this axial force is applied to the fixed sheave 41a by means of the output-side cam 41g. Meanwhile, a reaction force of this axial force is transmitted from the input-side cam 41f to the movable sheave 41b via the primary shaft 35, flange 35a, self-aligning mechanism 41p, bearing 41o, adjustment member 41n, externally threaded portion 41j of the ball screw device 41i, internally threaded portion 41k of the ball screw device 41i, self-aligning mechanism 41q, and bearing 41r. The axial force applied to the fixed sheave 41a and the movable sheave 41b constitutes a clamping force for the belt 43 so that this clamping force for the belt 43 assumes a magnitude corresponding to the transmitted torque which is delivered from the carrier 36. In addition, the transmitted torque from the carrier 36 is transmitted to the primary sheave 41 via the pressure-governing cam mechanism 41e and then to the secondary sheave 42 via the V-belt 43.

Furthermore, the externally threaded portion 41k has a gear 41s formed on an outer periphery of one end thereof. This gear 41s meshes with a gear 44f provided on a counter shaft 44b. The counter shaft 44b is connected to an output shaft 44d of a CVT speed-changing motor 44 via a reduction gear mechanism 44c.

Likewise a pressure-governing cam mechanism 42e is interposed between the output shaft 45 and the fixed sheave 42a. The pressure-governing cam mechanism 42e is similar to the pressure-governing cam mechanism 41e for the primary sheave 41, and comprises an input-side cam 42f and an output-side cam 42g both having opposing surfaces thereof formed into a corrugated configuration, as well as a roller 42h interposed between the opposing surfaces of the cams 42f and 42g. The input-side cam 42f is spline fitted with the fixed sheave 42a, and a surface thereof which is remote from the surface coming into contact with the roller 42h abuts against a rear surface of the fixed sheave 42a via a disk spring. Meanwhile, the output-side cam 42g is affixed to the output shaft 45 of the V-belt type continuously variable transmission unit 4.

In addition, a ball screw device 42i is provided at a rear portion of the movable sheave 42b, and this ball screw device 42i comprises an externally threaded portion 42j, an internally threaded portion 42k, and a multiplicity of balls 42m disposed between thread grooves of the threaded portions 42j, 42k. The externally threaded portion 42j is supported by an output gear 45a formed at an end of the output shaft 45 via an adjustment member 42n, a bearing 42o, and a self-aligning mechanism 42p. The arrangement provided is such that the externally threaded portion 42j is rotated relative to the internally threaded portion 42k by rotating the adjustment member 42n so as to adjust the widthwise center of the secondary sheave 42 at the time of adjustment of the initial tension of the belt 43 and during rotational movement of the belt.

Accordingly, the torque transmitted from the primary sheave 41 to the secondary sheave 42 is applied to the input-side cam 42f and is converted to an axial force corresponding to the magnitude of the transmitted torque by means of the pressure-governing mechanism 42e. This axial force is transmitted from the output-side cam 42g to the movable sheave 42b via the output shaft 45, output gear 45a, self-aligning mechanism 42p, bearing 42o, adjustment member 42n, externally threaded portion 42j of the ball screw device 42i, internally threaded portion 42k of the ball screw device 42i, self-aligning mechanism 42q, and bearing 42r. Meanwhile, a reaction force of this axial force is applied to the fixed sheave 42a via the input-side cam 42f. The axial force applied to the fixed sheave 42a and the movable sheave 42b constitutes a clamping force transmitted to secondary sheave 42 for clamping the belt 43. Accordingly, this clamping force for the belt 43 assumes a magnitude corresponding to the transmitted torque which is delivered from the primary sheave 41.

In addition, the internally threaded portion 42k is supported by a rear portion of the movable sheave 42b via the self-aligning mechanism 42q and the bearing 42r. Furthermore, the internally threaded portion 42k has a gear 42s formed at an outer periphery of an end thereof, and the gear 42s meshes with a gear 44e provided on the counter shaft 44b.

The torque of the CVT speed-changing motor 44 is reduced by the reduction gear mechanism 44c and is transmitted to the counter shaft 44b and then to the internally threaded portion 41k via the gear 44c. As a result, the internally threaded portion 41k rotates relative to the externally threaded portion 41j. Meanwhile, the reduced torque from the CVT speed-changing motor 44 transmitted to the counter shaft 44b is transmitted to the gear 42s via another unillustrated counter shaft. Hence, the internally threaded portion 42k rotates relative to the externally threaded portion 42j. The relative rotation of these internally threaded portions 41k, 42k cause both movable sheaves 41b, 42b to move axially between the underdrive side indicated by the solid line and the overdrive side indicated by two-dotted dash line via the respective ball screw devices 41i, 42i relative to the fixed sheaves 41a, 42a while being synchronized therewith. As a result, continuously variable speed-change is effected.

Accordingly, as the CVT speed-changing motor 44 is controlled in correspondence with various running conditions and the movable sheaves 41a, 42a are controlled as required, thereby making it possible to effect automatic speed-change control in correspondence with the various running conditions.

In addition, a brake 49 for holding the CVT speed-changing motor 44 is provided. The operation of the CVT speed-changing motor 44 and the brake 49 is controlled on the basis of control signals from the electronic controller 6, respectively. Furthermore, the CVT speed-changing motor 44 is provided with a motor speed detecting means 46, and this motor speed detecting means 46 is adapted to output the number of revolutions $n_m$ of the CVT speed-changing motor 44 to the electronic controller 6. In addition, a primary sheave speed detecting means 47 and a secondary sheave speed detecting means 48 are respectively connected to the electronic controller 6. These detecting means 47, 48 are adapted to detect the number of revolutions of the corresponding sheaves 41, 42 and output their number-of-revolution signals $n_p$, $n_s$ to the electronic controller 6.

The hydraulic controller 5 is provided with a pump 51, a line pressure controller 52, a lock-up controller 53, a speed selector 54, and a back pressure controller 55. The lock-up controller 53 is actuated by a solenoid 56 whose on/off operation is controlled by a lock-up pressure control signal $P_l$ transmitted from the electronic controller 6, so as to control the lock-up clutch 21. In addition, the speed selector 54 is adapted to control the forward clutch 31 and the reverse brake 32. Furthermore, the back pressure controller 55 is actuated by a solenoid 57 whose on/off operation is controlled by a back pressure control signal $P_b$ transmitted from the electronic controller 6, so as to control the back pressure of accumulators of the forward clutch 31 and the reverse brake 32.

The pattern selecting means 7 is for selecting and setting an economy mode E or a power mode P, and its selection signal $P_s$ is arranged to be outputted to the electronic controller 6.

The shift lever 8 for effecting automatic speed-change is provided with a shift position detecting means 81. This shift position detecting means 81 is arranged to detect the shift position of the shift lever 8 and output its detection signal s to the electronic controller 6.

The brake 9 is for applying braking to the vehicle, and this brake 9 is provided with a brake detecting means 91, a brake signal b from the brake detecting means 91 being similarly inputted to the electronic controller 6.

A steering wheel 105 is provided with a steering angle detecting means 106, and a steering angle signal $R_s$ from this steering angle detecting means 106 is inputted to the electronic controller 6.

Furthermore, the vehicle is provided with a lateral acceleration detecting means 107, and a lateral acceleration signal $G_s$ from this lateral acceleration detecting means 107 is similarly inputted to the electronic controller 6.

Also, a signal manual setting device 108 is provided, and signals $s_1$, $s_2$ that are freely set by the driver are similarly inputted to the electronic controller 6.

Accordingly, the electronic controller 6 outputs the lock-up pressure control signal $P_l$, back pressure control signal $P_b$, CVT speed-changing motor control signal m, and motor-holding brake signal $b_m$, respectively, on the basis of the throttle opening signal $\theta$, A/T oil temperature signal t, engine speed signal $N_{E/G}$, motor speed signal $n_m$, primary sheave speed signal $n_p$, secondary sheave speed signal $n_s$, pattern selection signal $P_s$, shift position signal s, brake actuation signal b, steering angle signal $R_s$, lateral acceleration signal $G_s$, and signals $s_1$, $s_2$ from the signal manual setting device, thereby to control the hydraulic controller 5 and the CVT unit 4.

Figure 3A:
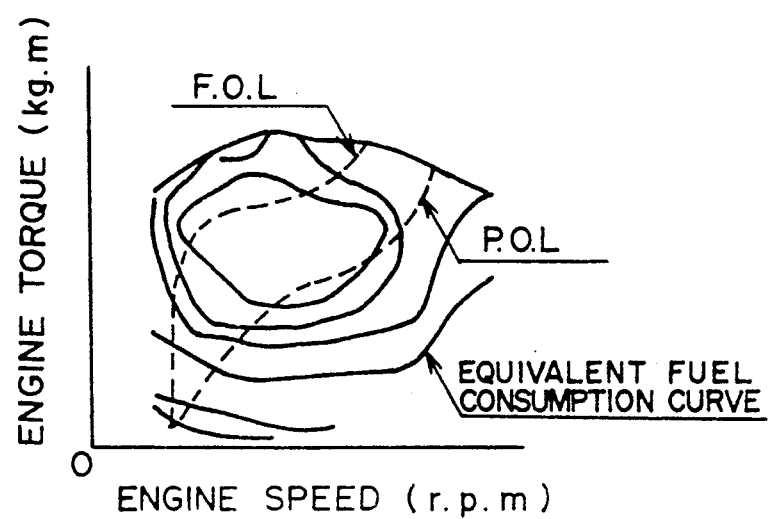
FIGS. 3 (a-b) are diagrams illustrating the engine performance.
Figure 3B:
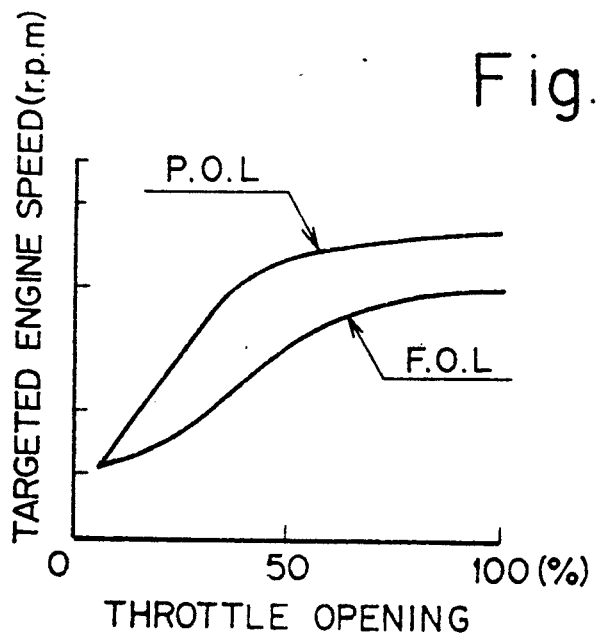

The engine 1 has performance characteristic such as shown in FIGS. 3A and 3B. FIG. 3A illustrates a best fuel consumption curve (F.O.L.) and a maximum power curve (P.O.L.) plotted with respect to the engine speed and engine torque, and an equivalent fuel consumption curve is also shown. FIG. 3B shows F.O.L. and P.O.L. plotted with respect to the throttle opening and targeted engine speed. These data are stored as internal data in the electronic controller 6.

Figure 4A:
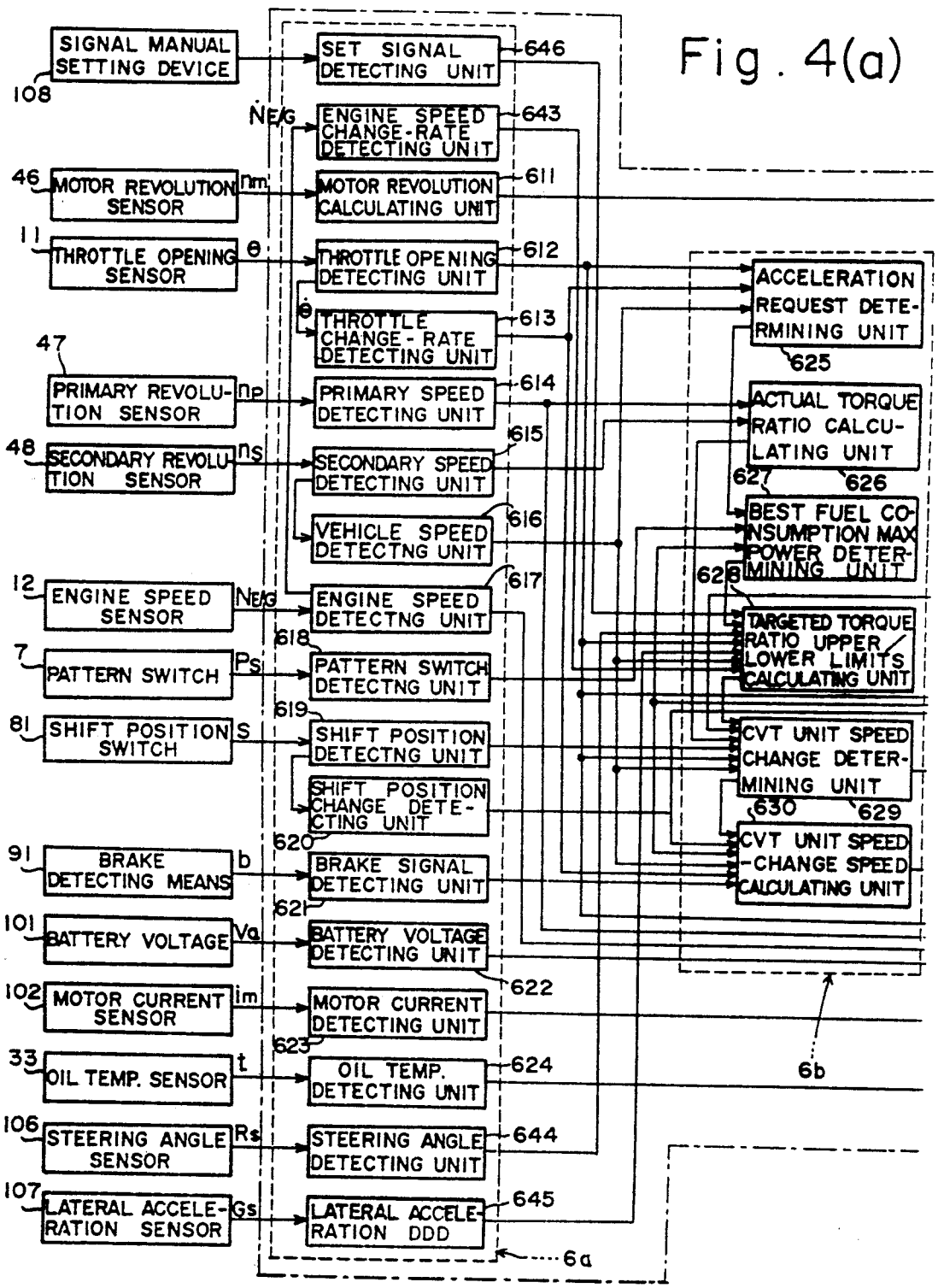
FIGS. 4 (a-b) are block diagrams of an electronic controller.
Figure 4B:
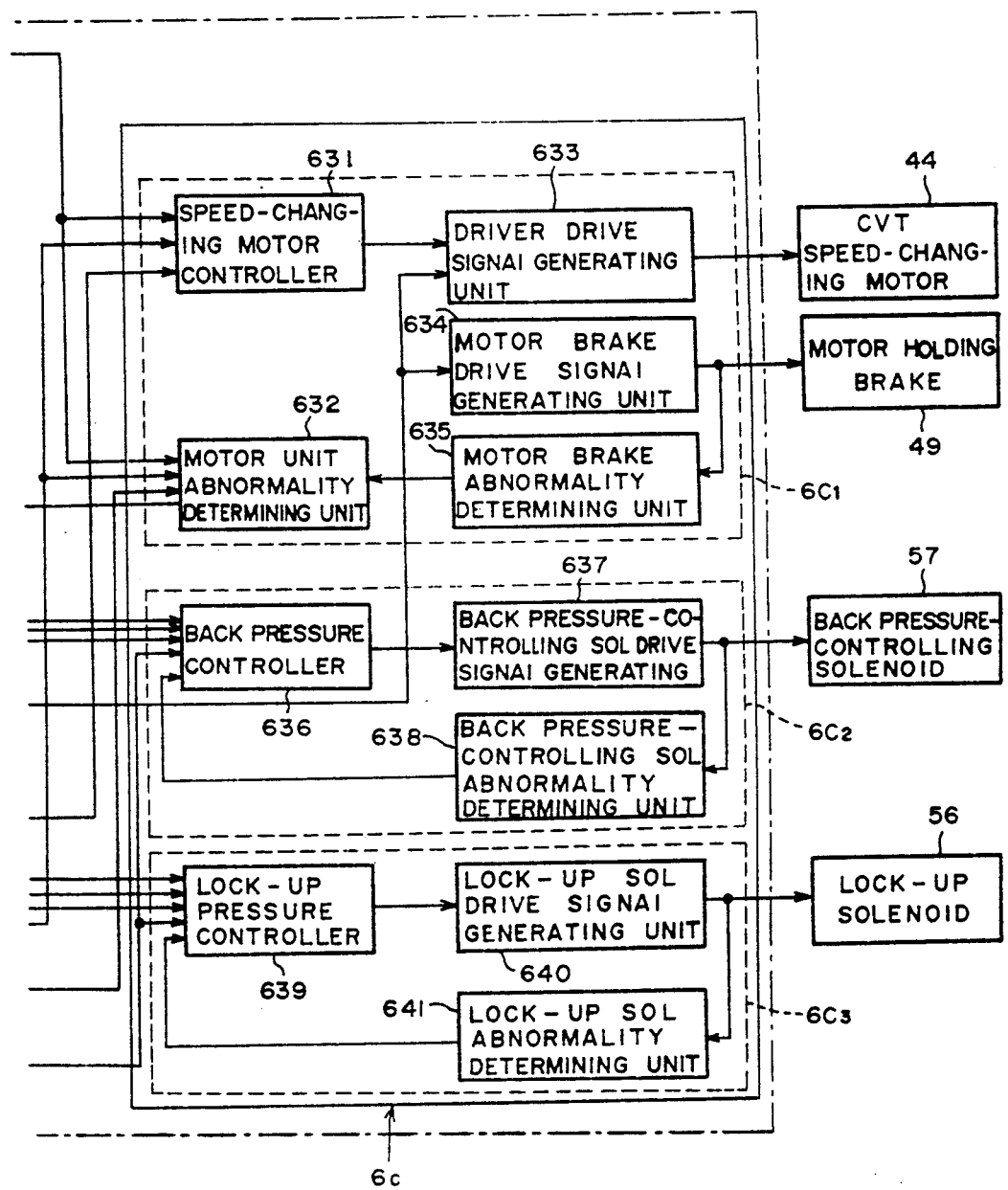

FIG. 4 is a block diagram of functions that are executed by the electronic controller 6.

As shown in FIG. 4, the electronic controller 6 comprises an input unit 6a, a calculating unit 6b, and an output unit 6c.

The input unit 6a comprises the following units: a motor speed calculating unit 611 to which the signal $n_m$ from the motor speed detecting means 46 is inputted; a throttle opening detecting unit 612 to which the signal $\theta$ from the throttle opening detecting means 11 is inputted; a throttle change-rate detecting unit 613 for detecting a throttle change rate $\dot{\theta}$ on the basis of the throttle opening $\theta$ inputted to this throttle opening detecting unit 612, by taking into consideration a soft timer; a primary sheave speed detecting unit 614 to which the signal $n_p$ from the primary sheave speed detecting means 47 is inputted; a secondary sheave speed detecting unit 615 to which the signal $n_s$ from the secondary sheave speed detecting means 48 is inputted; a vehicle speed detecting unit 616 for detecting vehicle speed V on the basis of the secondary sheave speed $n_s$ inputted to this secondary sheave speed detecting unit 615; an engine speed detecting unit 617 to which the signal $N_{E/G}$ from the engine speed detecting means 12 is inputted; an engine speed change-rate detecting unit 643 for detecting an engine speed change-rate $\overset{o}{N}_{E/G}$ on the basis of the engine speed $N_{E/G}$ inputted to this engine speed detecting unit 617; a power switch detecting unit 618 to which the signal $p_s$ representing the economy mode E or the power mode P from the pattern selecting means 7 is inputted; a shift position detecting unit 619 to which the signal s from the shift position detecting means 81 is inputted; a shift position change-rate detecting unit 620 for detecting a shift position change s on the basis of the shift position $\dot{s}$ inputted to this shift position detecting unit 619; a brake signal detecting unit 621 to which the brake actuation signal b from the brake detecting means 91 is inputted; a battery voltage detecting unit 622 to which a battery voltage signal $V_p$ from a battery voltage detecting means 101 is inputted; a motor current detecting unit 623 to which a signal $i_m$ from a motor current detecting means 102 is inputted; an oil temperature detecting unit 624 to which the signal t from the oil temperature detecting means 33 is inputted; a steering angle detecting unit 644 to which the signal Rs from the steering angle detecting means 106 is inputted; a lateral acceleration detecting unit 645 to which the signal $G_s$ from the lateral acceleration detecting means 107 is inputted; and a set signal detecting unit 646 to which the signals $s_1$, $s_2$ from the signal manual setting device 108 are inputted.

The calculating unit 6b comprises an acceleration request determining unit 625, an actual torque ratio calculating unit 626, a best-fuel-consumption/maximum-power determining unit 627, a targeted torque ratio upper/lower limits calculating unit 628, a CVT unit speed-change determining unit 629, and a CVT unit speed-change speed calculating unit 630.

The output unit 6c comprises a control signal outputting unit $6c_1$ for the CVT speed-changing motor 44, a back-pressure control signal outputting unit $6c_2$ for the accumulator of the hydraulic controller 5 in the CVT unit 4, and a lock-up control signal outputting unit $6c_3$.

The control signal outputting unit $6c_1$ for the CVT speed-changing motor 44 comprises a speed-changing motor controlling unit 631, a motor unit abnormality detecting unit 632, a driver drive signal generating unit 633, a motor brake drive signal generating unit 634, and a motor brake abnormality determining unit 635.

The back-pressure control signal outputting unit $6c_2$ for the accumulator of the hydraulic controller 5 in the CVT unit 4 comprises a back pressure controlling unit 636, a back-pressure controlling solenoid drive signal generating unit 637, and a back-pressure controlling solenoid abnormality determining unit 638.

The lock-up control signal outputting unit $6c_3$ comprises a lock-up pressure controlling unit 639, a lock-up solenoid drive signal generating unit 640, and a lock-up solenoid abnormality determining unit 641.

The acceleration request determining unit 625 receives a signal from the throttle opening detecting unit 612, a signal from the throttle change-rate detecting unit 613, and a signal from the vehicle speed detecting unit 616, determines on the basis of these signals whether or not an acceleration request has been made, and outputs the result of determination to the best-fuel-consumption/maximum-power determining unit 627.

The actual torque ratio calculating unit 626 receives a signal from the primary speed detecting unit 614 and a signal from the secondary speed detecting unit 615, calculates the actual torque ratio on the basis of these signals, and outputs the result of calculation to the CVT unit speed-change determining unit 629.

The best-fuel-consumption/maximum-power determining unit 627 receives a signal from the acceleration request determining unit 625, a signal from the pattern switch detecting unit 618, and a signal from the shift position detecting unit 619, and determines on the basis of these signals whether control is to be effected with the best fuel consumption characteristic or the maximum power characteristic, and outputs the result of calculation to the targeted torque ratio upper/lower limits calculating unit 628.

The targeted torque ratio upper/lower limits calculating unit 628 receives the following signals: a signal from the best-fuel-consumption/maximum-power determining unit 627, a signal from the throttle opening detecting unit 612, a signal from the engine speed change-rate detecting unit 643, a signal from the vehicle speed detecting unit 616, a signal from the steering angle detecting unit 644, a signal from the lateral acceleration detecting unit 645, and a signal from the set signal detecting unit 646. The targeted torque ratio upper/lower limits calculating unit 628 then calculates upper and lower limits $T^*_{max}$, $T^*_{min}$ of the targeted torque ratio on the basis of these signals, and outputs the result of calculation to the CVT unit speed-change determining unit 629.

The CVT unit speed-change determining unit 629 receives the following signals: a signal from the targeted torque ratio upper/lower limits calculating unit 628, a signal from the motor unit abnormality detecting unit 632, a signal from the actual torque ratio calculating unit 628, a signal from the shift position detecting unit 619, a signal from the throttle opening detecting unit 612, and a signal from the vehicle speed detecting unit 616. The CVT unit speed-change determining unit 629 then determines on the basis of these signals whether or not the belt torque ratio for the CVT unit should be changed, and outputs the speed-change signal to the CVT unit speed-change calculating unit 630, the driver drive signal generating unit 633, and the motor brake drive signal generating unit 634, respectively.

The CVT unit speed-change calculating unit 630 receives the following signals: a signal from the CVT unit speed-change determining unit 629, a signal from the shift position change detecting unit 620, a signal from the shift position detecting unit 619, a signal from the vehicle speed detecting unit 616, a signal from the throttle change-rate detecting unit 613, and a signal from the brake signal detecting unit 621. The CVT unit speed-change calculating unit 630 then calculates a CVT unit speed-change speed for realizing a request at the current point of time on the basis of these signals and outputs the result of calculation to the speed-changing motor controlling unit 631.

The speed-changing motor controlling unit 630 outputs a signal to the driver drive signal generating unit 633 on the basis of a signal from the motor speed calculating unit 611, a signal from the battery voltage detecting unit 622, and a signal from the CVT unit speed-change speed calculating unit 630. On the basis of this signal, the rotating direction of the motor 44 and a voltage to be applied to the motor 44 are controlled so as to realize a speed change of the CVT unit 4 as required.

The motor unit abnormality detecting unit 632 detects any abnormality such as an eddy current in the motor 44, saturation of the velocity of the motor 44, or a locked state of the motor 44 on the basis of a signal from the motor speed calculating unit 611, a signal from the battery voltage detecting unit 622, a signal from the motor current detecting unit 623, and a signal from the motor brake abnormality detecting unit 635. The motor unit abnormality detecting unit 632 then outputs its detection signal to the CVT unit speed-change determining unit 629.

The driver drive signal generating unit 633 generates a voltage signal to be applied to the motor-driving driver in the case where a speed-change command has been given to the CVT speed-changing motor 44, on the basis of a signal from the speed-changing motor controlling unit 631 and a signal from the CVT unit speed-chang determining unit 629. The driver drive signal generating unit 633 then outputs that voltage signal to the CVT speed-changing motor 44.

The motor brake drive signal generating unit 634 outputs a signal in such a manner as to release the motor-holding brake 49 in the case where a speed-change command has been applied to the CVT speed-changing motor 44, on the basis of a signal from the CVT unit speed-change determining unit 629. Also, this signal is outputted to the motor brake abnormality determining unit 635 as well.

The motor brake abnormality determining unit 635 monitors the brake actuating voltage on the basis of the signal from the motor brake drive signal generating unit 634 so as to detect an abnormality of the motor brake such as a disconnection, a short-circuit, and the like, and outputs that signal to the motor abnormality detecting unit 632.

The back pressure controlling unit 636 outputs a control signal to the back-pressure controlling solenoid drive signal generating unit 637 so as to control a shift feeling at the time of a shift from N to D, or N to R, on the basis of a signal from the throttle opening detecting unit 612, a signal from the shift position detecting unit 619, a signal from the shift position change detecting unit 620, a signal from the oil temperature detecting unit 624, and a signal from the back-pressure controlling solenoid abnormality determining unit 638.

The back-pressure controlling solenoid drive signal generating unit 637 outputs a solenoid drive signal to the back-pressure controlling solenoid 57 on the basis of the signal from the back-pressure controlling unit 636, and also outputs the signal to the back-pressure controlling solenoid abnormality determining unit 638 as well.

The back-pressure controlling solenoid abnormality determining unit 638 determines and detects an abnormality of the back-pressure controlling solenoid 57 such as a disconnection or short-circuit on the basis of a signal from the back-pressure controlling solenoid drive signal generating unit 637, and outputs that signal to the back-pressure controlling unit 636.

The lock-up pressure controlling unit 639 determines either the on- or off-duty of the lock-up on the basis of a signal from the throttle opening detecting unit 612, a signal from the primary speed detecting unit 614, a signal from the engine speed detecting unit 617, a signal from the oil temperature detecting unit 624, and a signal from the lock-up solenoid abnormality determining unit 641, and outputs the result of this determination to the lock-up solenoid drive signal generating unit 640.

The lock-up solenoid drive signal generating unit 640 outputs a solenoid drive signal to the lock-up solenoid 56 on the basis of the signal from the lock-up pressure controlling unit 639, and also outputs the signal to the lock-up solenoid abnormality determining unit 641 as well.

The lock-up solenoid abnormality determining unit 641 determines and detects an abnormality of the lock-up solenoid 56 such as a disconnection, short-circuit, and the like, and outputs the signal to the lock-up pressure controlling unit 639.

A description will now be given of the control effected by the electronic controller 6. FIG. 5 is a diagram illustrating a main flow of that control.

First, in Step 1000, a determination is made as to whether or not a fixed time $t_1$ has elapsed. After the lapse of the fixed time $t_1$, control of the CVT is commenced. In Step 1001, input data from various detecting means is read. In this process, signals from the various detecting means are read as digital values by the input unit 6a so that they can be processed by the electronic controller 6. Next, in Step 1005, actual speed ratio is calculated. In this calculation, the actual torque ratio (belt ratio) $T_p$ is calculated on the basis of the primary speed $n_p$ and the secondary speed $n_s$ in accordance with the following formula:

$$T_p = n_p/n_s$$

In an ensuing Step 1006, processing is effected for calculating upper and lower limits of the targeted speed ratio. In this calculation, upper and lower limits of the targeted engine speed are determined on the basis of an actual throttle opening $\theta$, velocity V, present running mode $p_s$ (power mode P or economy mode E), and other set signals, and other running conditions of the vehicle. On the basis of these upper and lower limits of the targeted engine speed and the vehicle speed V, the upper and lower limits of the targeted speed ratio is calculated. That is, as shown in FIG. 6, in Step 1007, a determination is made as to whether or not the lock-up is off. If the lock-up is off, in Step 1008, the targeted speed ratio T* is determined on the basis of a ratio of K to T, i.e., in accordance with the following formula:

$$T^* = K/T$$

where K is a coefficient which is determined in accordance with the following formula:

$$K = T_{out}/(T_e - I \cdot \dot{\omega}_e)$$

on the basis of the conditions of the vehicle and the drive system, e.g., the engine speed $N_{E/G}$ stored in advance in a fixed memory, an engine torque $T_e$ with respect to the throttle opening $\theta$, an engine angular velocity change rate $\dot{\omega}_e$ calculated on the basis of the engine speed change rate $\dot{N}_{E/G}$, moment of inertia I of an input system including the engine and T/C, and a necessary output torque $T_{out}$ which is determined from the torque capacity of the continuously variable speed-change unit and the slip limit of the tire; and T is a speed ratio of the torque converter T/C 22 which is determined on the basis of the throttle opening $\theta$ and the engine speed $N_{E/G}$, or on the basis of the engine speed $N_{E/G}$ and the primary speed $n_p$.

Then, in Step 1009, a determination is made as to whether or not the targeted speed ratio T* thus determined is greater than a speed ratio $T_{U/D}$ in a state of underdrive U/D. If the targeted speed ratio T* is smaller than the speed ratio $T_{U/D}$ in the state of underdrive U/D, in Step 1010 the value of the targeted speed ratio T* is determined as the targeted speed ratio $T^*_{max}$ at the upper limit ($T^*_{max}$–T*). At the same time, the difference between the value of the targeted speed ratio T* and a coefficient ΔT for calculating a lower limit targeted speed ratio is determined as the targeted speed ratio $T^*_{min}$ at the lower limit. In addition, when the lock-up is on in Step 1007, and when the targeted speed ratio T* is not less than the speed ratio $T_{U/D}$ in the state of underdrive U/D in Step 1009, then in Step 1011 the targeted engine speed N* is calculated on the basis of the throttle opening θ and the engine performance data and the like stored, and a range $N_H$ between the upper and lower limits of the targeted engine speed, $N^*_{max}$, $N^*_{min}$, is calculated in accordance with a routine for calculating a range between the upper and lower limits of the targeted engine speed shown in FIG. 13. The upper and lower limits $N^*_{max}$, $N^*_{min}$ of the targeted engine speed are thereby calculated. Then, in Step 1012, using $N^*_{max}$, $N^*_{min}$, the targeted speed ratio $T^*_{max}$ at the upper limit and the targeted speed ratio $T^*_{min}$ at the lower limit are respectively determined in accordance with the following formulae:

$$T^*_{max} = N^*_{max} \times a/V$$

$$T^*_{min} = N^*_{min} \times a/V$$

Figure 7:
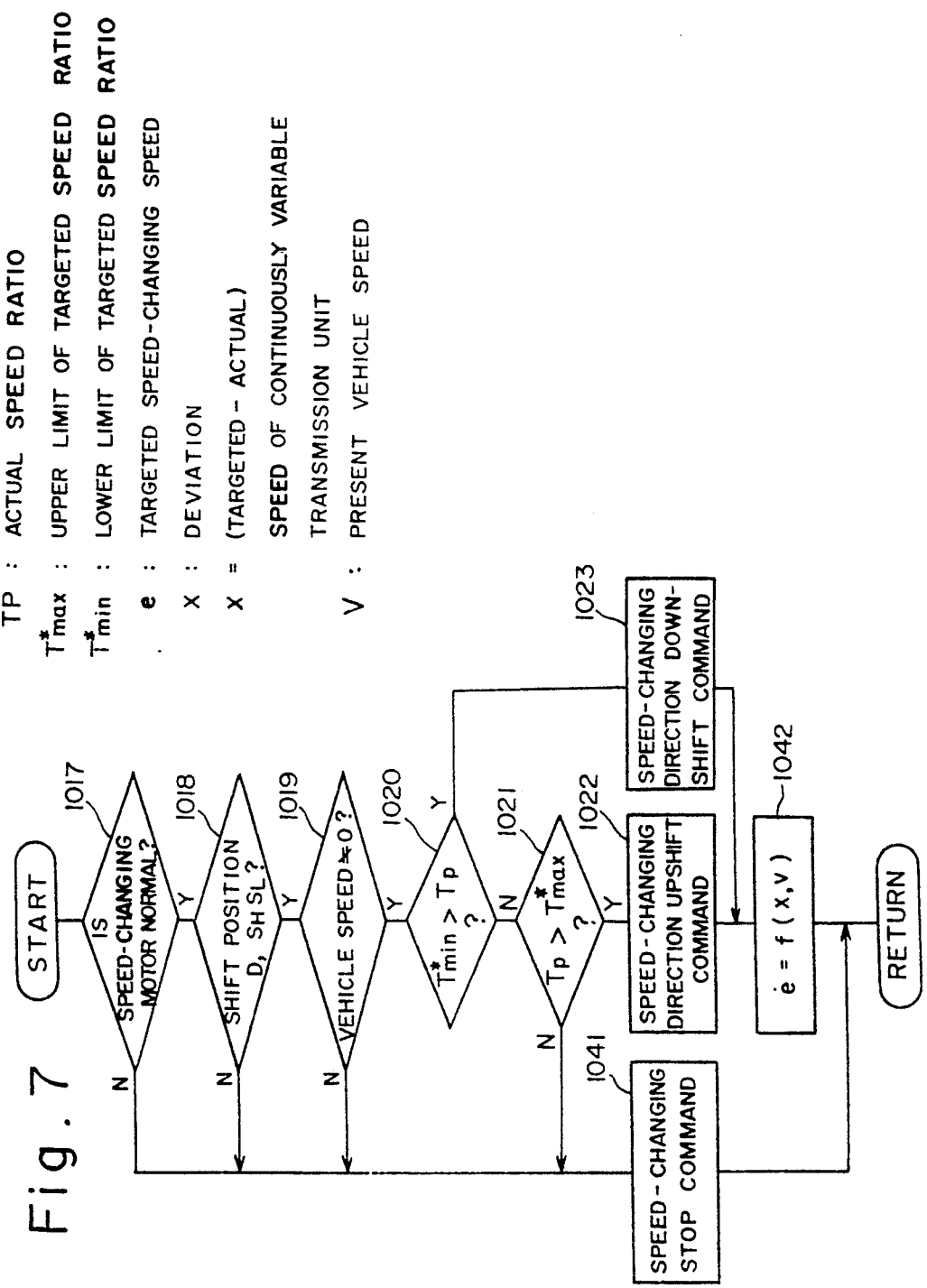
FIG. 7 is a flowchart for the processing of a speed-change determination by a CVT unit.

Then, as shown in FIG. 5, processing for CVT unit speed-change determination is conducted in Step 1013, where a determination is made of a speed with which a speed change is to be effected in the upshifting direction or downshifting direction, on the basis of the actual speed ratio, targeted speed ratio, vehicle speed, shift position, brake, CVT motor 44, and the state of the holding brake 49. This processing for CVT unit speed-change determination is executed in accordance with the flow shown in FIG. 7. Namely, in Step 1017, a determination is made as to whether or not the CVT speed-changing motor 44 is normal. If the CVT speed-changing motor 44 is normal, a determination is made in Step 1018 as to whether the shift position is any of D, $S_H$, and $S_L$. If the shift position is any of D, $S_H$, and $S_L$, a determination is made in Step 1019 as to whether or not the vehicle speed is 0. If the vehicle speed is not 0, a determination is made in Step 1020 as to whether or not the actual speed ratio $T_p$ is smaller than the targeted speed ratio $T^*_{min}$ at the lower limit. If the actual speed ratio $T_p$ is not smaller than the targeted speed ratio $T^*_{min}$ at the lower limit, a determination is made in Step 1021 as to whether or not the actual speed ratio $T_p$ is greater than the targeted speed ratio $T^*_{max}$ at the upper limit. If the actual speed ratio $T_p$ is greater than the targeted speed ratio $T^*_{max}$ at the upper limit, a command is given in Step 1022 to upshift in terms of the speed-changing direction. On the other hand, if the actual speed ratio $T_p$ is smaller than the targeted speed ratio $T^*_{min}$ at the lower limit in Step 1020, a command is given in Step 1023 to downshift in terms of the speed-changing direction. After the upshift command in Step 1022 or the downshift command in Step 1023, the targeted speed-change speed $\overset{\circ}{e}$ is calculated in Step 1042.

Figure 8:
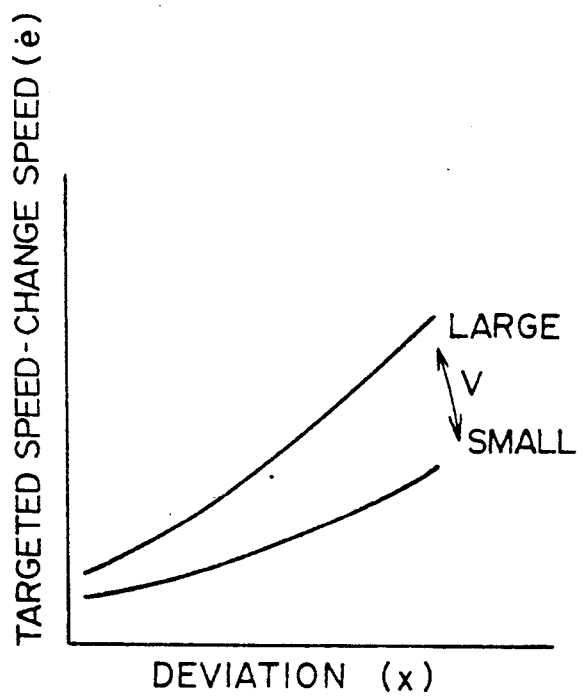
FIG. 8 is a diagram illustrating the relationship of a targeted speed-change speed with respect to a deviation between a targeted engine speed and an actual engine speed.

As shown in FIG. 8, this targeted speed-change speed $\overset{\circ}{e}$ is expressed as a function between a deviation x between the targeted speed ratio and the actual speed ratio on the one hand, and the present vehicle speed V on the other, {$\overset{\circ}{e}$=f(x,V)}. That is, the targeted speed-change speed $\overset{\circ}{e}$ is set on the basis of the deviation x and the vehicle speed V. In Steps 1017 1019 and 1021, if the respective determinations are NO, a speed-change stop command is issued in Step 1041. Accordingly, the speed change is not conducted in this case.

Figure 9:
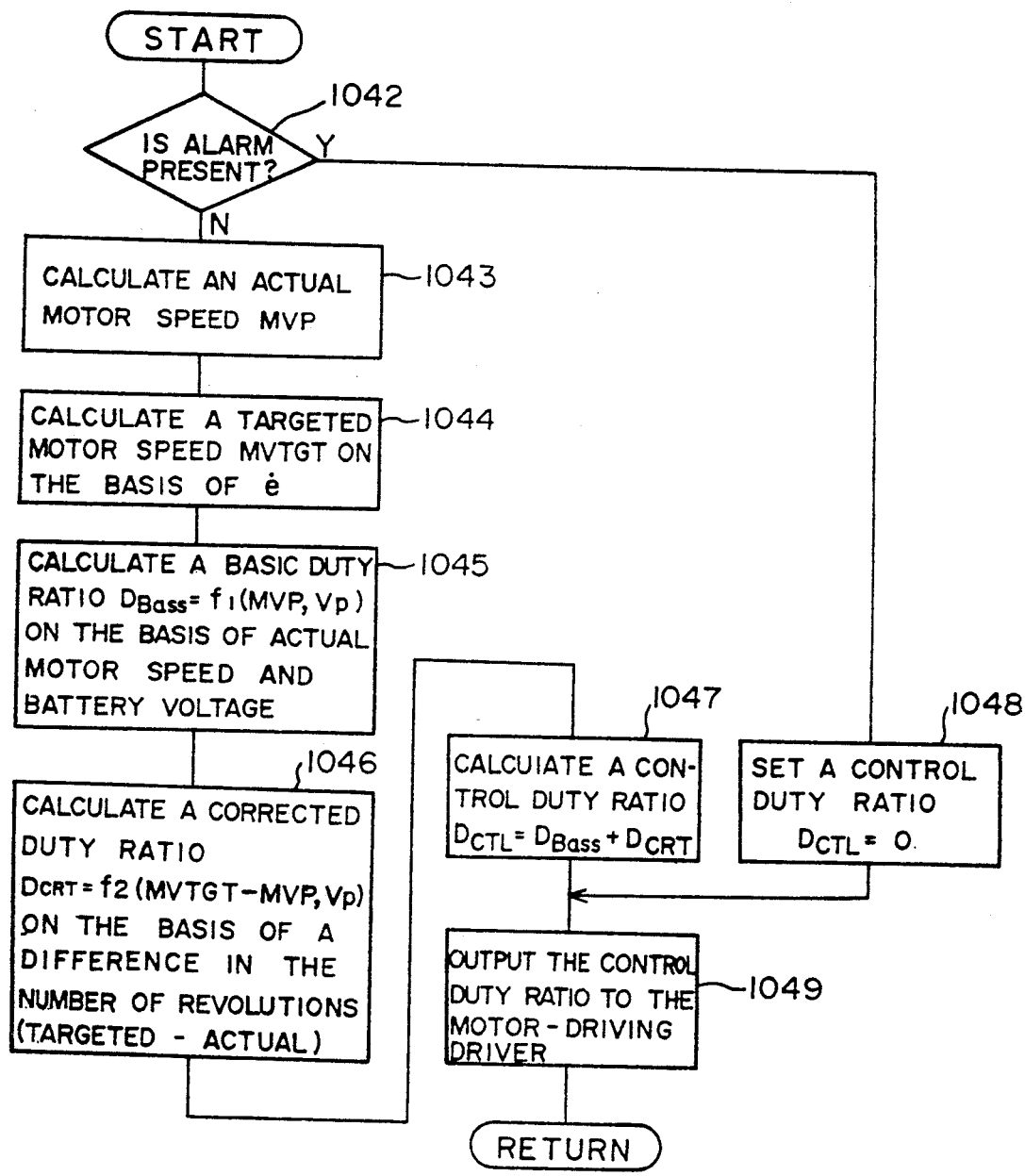
FIG. 9 is a flowchart for conducting motor control processing.
Figure 10:
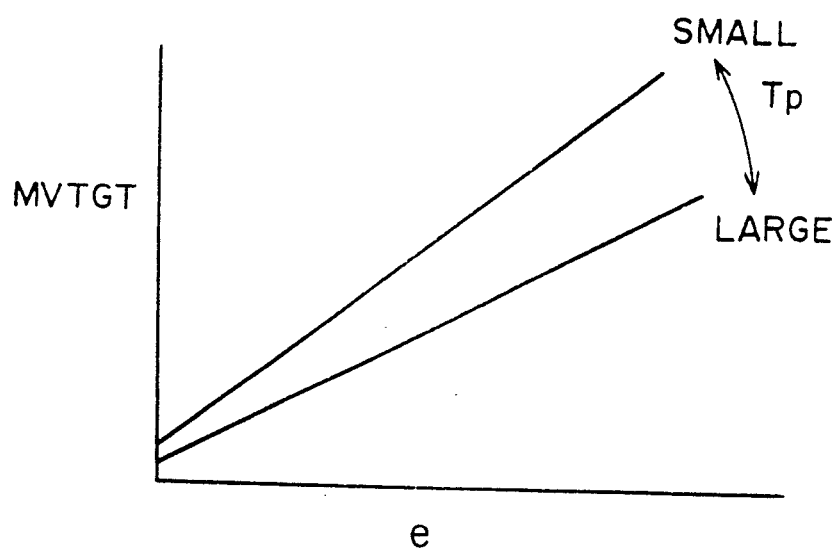
FIG. 10 is a diagram illustrating the relationship between the targeted motor speed and the targeted speed-change speed.
Figure 11:
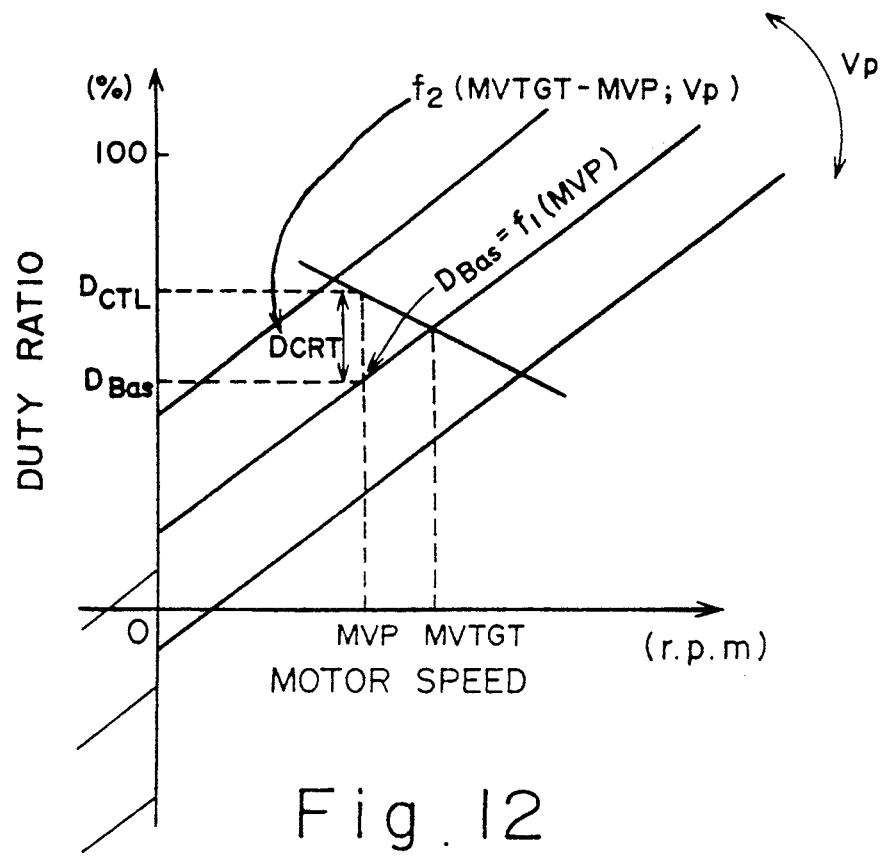
FIG. 11 is a diagram illustrating the relationship between the motor speed and a duty ratio.
Figure 12:
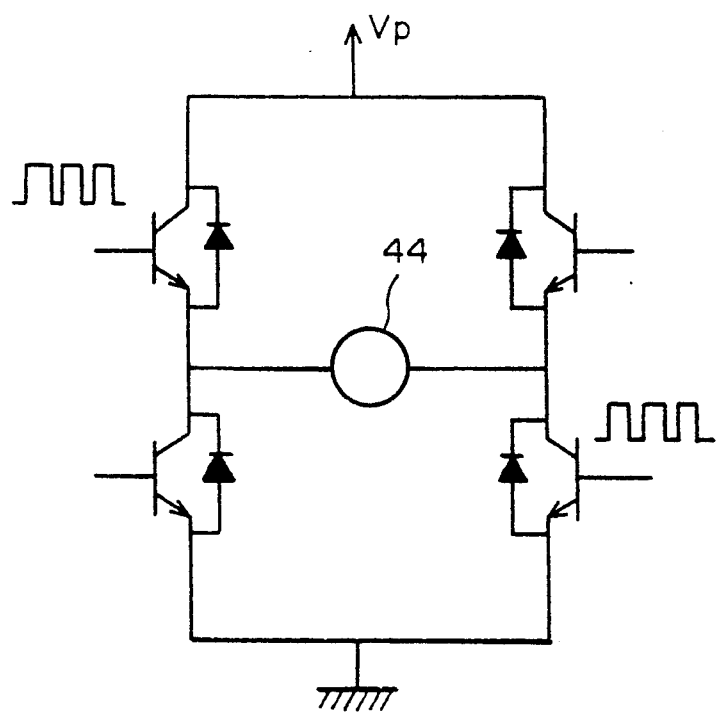
FIG. 12 is a diagram illustrating an electrical circuit of a motor.

Next, motor control processing is carried out in Step 1014. In this processing, the motor drive signal is controlled on the basis of the present number of revolutions of the motor and battery voltage so as to realize the speed-change speed calculated by CVT speed-change unit determination processing. That is, in the flow shown in FIG. 9, a determination is first made in Step 1042 as to whether or not an alarm is present in the CVT speed-change unit. If the alarm is not present, an actual motor speed MVP is calculated in Step 1043. Then, in Step 1044, a targeted motor speed MVTGT is calculated on the basis of the targeted speed-change speed $\overset{\circ}{e}$ and the actual speed ratio $T_p$. This targeted motor speed MVTGT is expressed as a function of the difference between the targeted speed-change speed $\overset{\circ}{e}$ and the actual speed ratio, $T_p$ [MVTGT=f($\overset{\circ}{e}$,$T_p$),], as shown in FIG. 10. Namely, the targeted motor speed MVTGT is set by the targeted speed-change speed $\overset{\circ}{e}$ and the actual speed ratio $T_p$. Furthermore, in Step 1045, a basic duty ratio $D_{Bas}$ {=$f_1$(MVT, $V_p$)} is calculated on the basis of the actual motor speed and the actual battery voltage. Then, in Step 1046, a corrected duty ratio $D_{CRT}${=$f_2$(MVTGT−MVT, $V_p$)} is calculated on the basis of the difference between the targeted engine speed and the actual engine speed, and the actual battery voltage. A control duty ratio $D_{CTL}$ (=$D_{Bas}$+$D_{CRT}$) is calculated from $D_{Bas}$ and $D_{CRT}$. In that case, in calculating each duty ratio, a diagram of the relationship between the number of revolutions of the motor and the duty ratio, shown in FIG. 11, is used. If the alarm is present in Step 1042, the control duty ratio $D_{CTL}$ is set to 0 in Step 1048. Finally, in Step 1049 the control duty ratio is outputted to the motor-driving driver circuit shown in FIG. 12, so as to control the drive of the motor 44.

Then, in Step 1015, back-pressure solenoid control processing is executed. In this process, the back pressure of the accumulator is controlled on the basis of the throttle opening θ, the shift position, and the oil temperature.

Finally, in Step 1016, the lock-up solenoid control processing is executed. In this process, the solenoid 56 for lock-up pressure is controlled on the basis of the primary speed $n_p$, the engine speed $N_{E/G}$, the throttle opening θ and the oil temperature t.

In the present invention, the range $N_H$ between the upper and lower limits $N^*_{max}$, $N^*_{min}$ of the targeted engine speed N* is rendered variable depending on the driver's requirements and preferences, as well as the running state of the vehicle. In addition, among the power performance, fuel consumption performance, control stability, and transmission efficiency that vary depending on $N_H$, the characteristics to be modified are determined and controlled in correspondence with the driver's requirements, preferences and the like, as well as the running state of the vehicle. As described above, conventionally, when the engine speed $N_{E/G}$ reaches $N^*$, $N^*_{max}$ and $N^*_{min}$ are provided, and the speed change is stopped when $N^*_{min} < N_{E/G} < N^*_{max}$, so as to secure control stability and prevent a decline in the transmission efficiency during speed changes. If $N_H$ is made large, the number of speed changes can be reduced, a decline in the transmission efficiency during speed changes can be prevented, and control stability improves. However, if $N_H$ is large, the difference between $N^*$ and $N_{E/G}$ becomes large, so that the power performance and the fuel consumption performance deteriorate. Accordingly, $N_H$ is controlled by determining whether emphasis is being placed on the power performance or fuel consumption performance, in correspondence with the running state of the vehicle and the driver's requirements, preferences, feelings, and so on.

Figure 13:
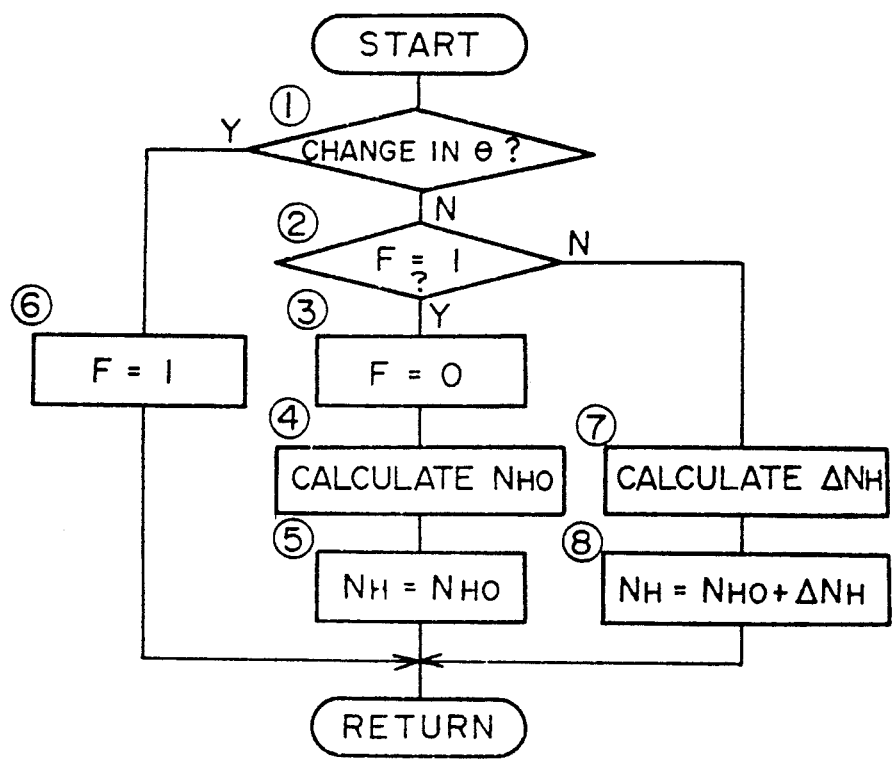
FIG. 13 is a flowchart of a routine for calculating upper and lower limits of a targeted engine speed.

For this reason, the range of $N_H$ between the upper and lower limits $N^*_{max}$, $N^*_{min}$ of the targeted engine speed $N^*$, in accordance with the routine shown in FIG. 13, is for calculating a range between the upper and lower limits of the targeted engine speed. In Step 1, the state of a change in the throttle opening $\theta$ is determined. Since the accelerator pedal is initially pressed, usually there is a change in $\theta$, so that the operation proceeds to Step 6. In Step 6, a throttle change flag F is set to 1, and the operation returns to Step 1. This cycle is repeated until there is no change in $\theta$. During this cycle, speed changes take place, and the engine speed $N_{E/G}$ changes in conformity with the maximum power curve (P.O.L) or the best fuel consumption curve (F.O.L.) (see FIG. 3). When the change in the throttle opening $\theta$ stops, the operation proceeds from Step 1 to 2 to confirm the throttle change flag F. Since F has been set to 1 in this case, the operation proceeds to Step 3 to change the throttle change flag F to 0, and the operation proceeds to Step 4. In Step 4, a calculation is made of an initial value $N_{HO}$ of the range $N_H$ between the upper and lower limits of the targeted engine speed $N^*$ in correspondence with a value derived from $A_1$, determined by the throttle opening $\theta$, and from a function $f(x_1, x_2)$ where $x_1$ is a variable expressing a request for changing the running state of the vehicle and $x_2$ is a variable expressing a request for stabilizing the running state of the vehicle, i.e., in accordance with a function $N_{HO} = A_1 \cdot f(x_1, x_2)$. As for this initial value $N_{HO}$, since the throttle opening $\theta$ has been changing up until now, it can be said that the request for changing the engine speed is strong. Accordingly, the range $N_H$ is usually selected within a relatively narrow range. However, the values of the parameters $x_1$, $x_2$ and the coefficient $A_1$ are taken into consideration in setting that range. In Step 5, the initial value $N_{HO}$ calculated as described above is set to the range $N_H$ between the upper and lower limits of the targeted engine speed $N^*$. Subsequently, the operation returns to Step 1, and since the flag has been set to 0, the operation proceeds to Step 7 to calculate an increment $\Delta N_H$ of the range $N_H$ between the upper and lower limits of the targeted engine speed. This increment $\Delta N_H$ is determined in correspondence with a variable $x_3$ which is determined by a change in the running state of the vehicle, or input signals ($\theta$, V, etc.) for the unchanged duration, or the manually set signal, in accordance with a formula $\Delta N_H = A_1 \cdot g(x_3)$ which will be described later. Then, in Step 8, this increment $\Delta N_H$ is added to the initial value $N_{HO}$ of the range between the upper and lower limits of the targeted engine speed so as to set the range $N_H$ between the upper and lower limits of a new targeted engine speed. Then, the operation returns to Step 1 again, and this cycle is repeated unless there is a change in the throttle opening $\theta$. The reason for adding the increment $\Delta N_H$ to the range of the upper and lower limits of the targeted engine speed to expand the range is because it can be judged that the driver does not wish to change the running state and desires stability since there is no change in the throttle opening $\theta$. It should be noted that the magnitude of this increment $\Delta N_H$ is determined by the magnitude of the variable $x_3$.

A description will now be given of the processing for calculating the initial value $N_{HO}$ in Step 4 above. As described before, the initial value $N_{HO}$ is calculated in accordance with $N_{HO} = A_1 \cdot f(x_1, x_2)$. Here, the variable $x_1$ is a variable which expresses the driver's request for changing the running state of the vehicle, or the driver's request for changing the vehicle speed, while the variable $x_2$ is a variable expressing the driver's request for stabilizing the running state of the vehicle, or the driver's desire to run the vehicle at a stable speed or without any speed change. Examples of $x_1$ are shown in FIG. 14A, and examples of $x_2$ are shown in FIG. 14B. As an example of the variable $x_1$, a throttle opening change rate $\Delta\theta$ is a difference between the initial value of the throttle opening and a value at the time when there is no longer any change in it. It means that the greater the change rate $\Delta\theta$, the stronger the request for change. A throttle opening change rate $\overset{\circ}{\theta}$ is an amount of change in the throttle opening per unit time. Similarly, it means that the greater this change rate $\overset{\circ}{\theta}$, e.g. the accelerator pedal has been pressed hard, the stronger the request for change. In addition, the fact that the vehicle acceleration $\overset{\circ}{V}$ is large and the vehicle speed is being accelerated, means that the driver desires to leave the high acceleration as it is, and constitutes a variable expressing a request for change. Variable $s_1$ denotes a manually set signal for requesting a change in the running state of the vehicle, and can be arbitrarily set in response to the driver's preference by means of a variable resistor, a switch, or the like. For the variable $x_1$, it is possible to use a combination of these elements. As an example of the variable $x_2$, it is possible to cite a lateral acceleration $G_s$, and the greater this $G_s$, the keener the driver's desire to stabilize the vehicle and the request for stabilization. Similarly, $s_2$ denotes a manually set signal for requesting the stabilization of the running state of the vehicle, and can be arbitrarily selected and set in response to the driver's preference by means of a variable resistor, a switch, or the like. In addition, $R_s \times V$ denotes steering angle $\times$ vehicle speed, and is similar to the lateral acceleration $G_s$. As the variable $x_2$, it is likewise possible to use a combination of these elements. In addition, as an example of the form of the aforementioned function $f(x_1, x_2)$, it is possible to represent the relationship between multiple inputs and a single output as follows:

$$f(x_1, x_2) = k_1/x_1 + k_2 x_2$$

Figure 15A:
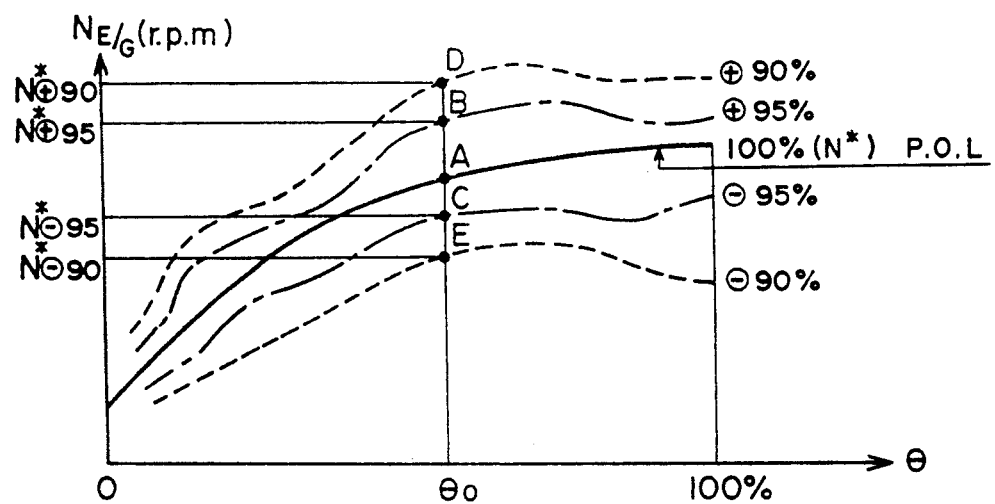
FIG. 15a and FIG. 15b are graphs illustrating a process for calculating a coefficient $A_1$.
Figure 15B:
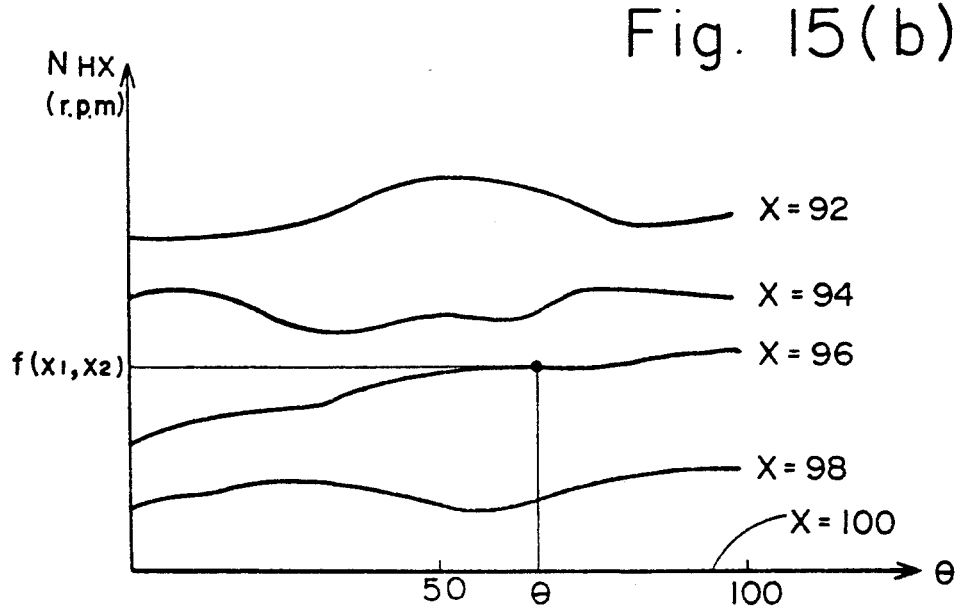
Figure 17:
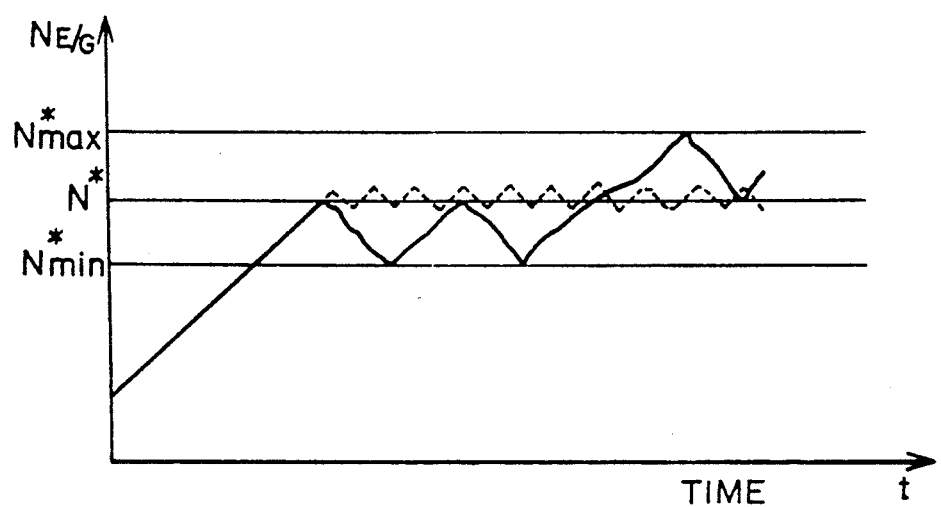
FIG. 17 is a graph illustrating a state of speed-change control in a case where upper and lower limits are provided for a targeted engine speed and a case where they are not provided.

(where $k_1$, $k_2$ are coefficients or constants determined by the operating status of the vehicle ($\overset{\circ}{V}$, etc.)). In such a relationship, the greater the $x_1$ value expressing a request for change, the smaller the $f(x_1, x_2)$ and the initial value $N_{HO}$, so that the request can be satisfied. Meanwhile, the greater the $x_2$ expressing a request for stabilization, the greater the $f(x_1, x_2)$ and the initial value $N_{HO}$ of the range, so that the request can be met. Now, as for an embodiment of the $A_1$ in $N_{HO} = A_1 \cdot f(x_1, x_2)$, as shown in FIG. 15A, curves are obtained by connecting the points of power at a fixed rate X of maximum power with respect to various throttle openings $\theta$ above and below the maximum power curve P.O.L., and these curves are obtained with respect to all the rates. Then, a graph as shown in FIG. 15B is prepared in which a gap $N_{HX}$ between the upper curve and the lower curve for each rate is plotted as the ordinate, and the throttle opening $\theta$ is plotted as the abscissa. On this graph, curves at fixed rates are prepared for all the rates. This data is stored in advance in the electronic controller 6. To give a specific example, if it is assumed that point A with a throttle opening $\theta_0$ represents 100 $P_s$, then:

Point B: $100 \times 0.95 = 95 P_s$

Point C: $100 \times 0.95 = 95 P_s$

Point D: $100 \times 0.90 = 90 P_s$

Point E: $100 \times 0.90 = 90 P_s$ and, accordingly, $$N_{H95} = N^*_{H+95} - N^*_{H-95}$$

and, similarly, $$N_{HX} = N^*_{H+X} - N^*_{H-X}.$$

If this is determined with respect to each throttle opening $\theta$, then a graph shown in FIG. 15B is obtained. Then, the value of X is determined from $f(x_1, x_2)$ obtained when $\theta = \theta_1$, as shown in FIG. 15B (in the drawing, $X = 96$). From this X, $A_1$ is obtained as follows:

$$A_1 = k_3 \cdot X \quad (k_3 \text{ is a constant})$$

When the engine speed $N_{E/G}$ has deviated from $N^*$ at each $\theta$, such $A_1$ becomes small when the decline in a characteristic (horsepower in the case of P.O.L.) is large, while $A_1$ becomes large when the decline is small even if the engine speed $N_{E/G}$ has deviated. Accordingly, if such $A_1$ is used, the initial value $N_{HO}$ of the range between the upper and lower limits of the targeted engine speed becomes similarly small when the decline in the characteristic is large, and becomes large when it is small even if the engine speed $N_{E/G}$ has deviated.

As described above, a setting can be provided in the following manner: The greater the request for change, the more narrowly the range of the initial value $N_{HO}$ calculated in Step 4 is set, whereas the greater the request for stabilization, the more widely the range of the initial value $N_{HO}$ is set. Furthermore, when the actual engine speed has deviated from the targeted engine speed, the initial value $N_{HO}$ is set at a small value if the decline in the characteristic required of the engine is large. Even when the actual engine speed has so deviated, the initial value $N_{HO}$ is set at a high level if the decline in the characteristic is small. It should be noted that the foregoing example is given by way of illustration only, and, for the variables $x_1$, $x_2$, the functin $f(x_1, x_2)$, and the coefficient $A_1$, various factors are conceivable other than those mentioned above.

A description will now be given of an example of the increment $\Delta N_H$ of the range $N_H$ between the upper and lower values of the targeted engine speed in Step 7 in FIG. 13. As described before, the increment is obtained as $\Delta N_H = A_1 \cdot g(x_3)$, but, as in $A_1$, for example, the one obtained in connection with FIG. 15 can be used, as described above. Furthermore, the function $g(x_3)$ is determined by the variable $x_3$ which is determined by a change in the running state of the vehicle, or an input signal ($\theta$, V, etc), an unchanged duration, or a manually set signal, as described above. As examples of the function $g(x_3)$, it is possible to cite those shown in FIG. 16, or a combination thereof. As a factor representing a change in the running state of the vehicle, it is possible to cite the vehicle acceleration $\dot{V}$. Since it can be said that the greater this value, the more the driver desires a change, it suffices that the increment $\Delta N_H$ may be small. The reason for the fact that an absolute value is plotted in the drawing is because both the accelerating direction and the decelerating direction have been taken into consideration. In addition, the lateral acceleration $G_s$ is also conceivable. Since it can be said that the greater this value, the more the driver desires stabilization, it can be said that the increment $\Delta N_H$ is desirably increased. Furthermore, for an unchanged duration of the an input signal, it is possible to cite an unchanged time $t_o$ of the throttle opening $\theta$, an unchanged time $t_v$ of the vehicle speed V, and so on. In these cases, since the longer the unchanged duration, the more the driver desires stabilization, the increment $\Delta N_H$ is desirably increased. In addition, in the same way as $s_2$ in FIG. 14B, it is possible to cite the manually set signal $s_2$ requesting stabilization of the running state of the vehicle. This signal can be set by being arbitrarily selected in response to the driver's preference by means of a variable resistor, a switch, or the like, and if this signal is set to a high level, $g(x_3)$ also becomes large, making it possible to increase the increment $\Delta N_H$. In this case, the greater the set signal $s_2$, the more the running stability increases. It should be noted that, as $g(x_3)$, a combination of the foregoing factors may be used. As $A_1$, if, for instance, the one obtained in connection with FIGS. 15A and 15B is used, as described above, a setting can be provided in the following manner: Since $\Delta N_H = A_1 \cdot g(x_3)$, the greater the request for change, the smaller the increment $\Delta N_H$ of the range $N_H$ between the upper and lower values of the targeted engine speed calculated in Step 7 is set to be, whereas the greater the request for stabilization, the larger the increment $\Delta N_H$ is set to be. Furthermore, the longer the unchanged duration of the input signal, the greater the increment $\Delta N_H$ is set to be. Moreover, when the actual engine speed has deviated from the targeted engine speed, the increment $\Delta N_H$ is set to be small when a decline in a characteristic required of the engine is large, while the increment $\Delta N_H$ is set to be large when the decline in the characteristic in small even if the actual engine speed has so deviated. It should be noted that the above example is given by way of illustration only, and, as the variable $x_3$, the function $g(x_3)$, and the coefficient $A_1$, various factors are conceivable other than those mentioned above.

As described above, with the apparatus for controlling a continuously variable transmission in accordance with the present invention, since the range between the upper and lower limits of the targeted engine speed is rendered variable depending on the driver's requirements ($\theta$, $\dot{\theta}$, $\Delta\theta$, etc.) and the running state by means of $x_1$, $x_2$, $x_3$, it is possible to properly determine which of the characteristics is to be maximized among the power performance, fuel consumption performance, control stability, and transmission efficiency in the light of the driver's requirements, preferences, and feelings, as well as the running state of the vehicle do effect adequate control. In addition, since the range between the upper and lower limits of the targeted input number of revolutions is increased by means of the manually set signals $s_1$, $s_2$, it is possible to allow the continuously variable transmission to be operated in the manner of a nonvariable transmission. For instance, a feeling of acceleration can be obtained during acceleration through an increase in the engine speed.

What is claimed is:

1. An apparatus for controlling a speed-change ratio of a continuously variable transmission driven by an engine having a throttle and mounted in a vehicle, comprising:

means responsive to an engine speed being outside of a predetermined targeted range of engine speeds selected on the basis of engine performance at a predetermined throttle opening for changing the speed-change ratio so as to change the engine speed to a value within the predetermined range of engine speeds, means for setting initial upper and lower limits of the predetermined targeted range of engine speeds when a change in the throttle opening ceases; and means for changing the upper and lower limits of the predetermined targeted range of engine speeds when there is no change in the throttle opening.

2. An apparatus for controlling a continuously variable transmission according to claim 1, wherein the initial upper and lower limits are set on the basis of any one of a variable expressing (a) a request for changing a running state of the vehicle, (b) a variable expressing a request for stabilizing the running state of the vehicle, (c) a manually set signal for requesting a change in the running state of the vehicle, and (d) a manually set signal for requesting stabilization of the running state of the vehicle, or a combination of (a), (b), (c) or (d).

3. An apparatus for controlling a continuously variable transmission according to claim 2, wherein said means for setting initial upper and lower limits is controlled by values of requests for change and by values of requests for stabilization so that the size of the predetermined targeted range of engine speeds is smaller for larger requests for change and is larger for larger requests for stabilization.

4. An apparatus for controlling a continuously variable transmission according to claim 2, wherein said means for changing the upper and lower limits of the predetermined targeted range of engine speeds sets a value for an increment of change in the size of the predetermined targeted range on the basis of any of (e) a change in the running state of said vehicle, (f) an unchanged duration of an input signal concerning said vehicle, and (g) a variable determined by a manually set signal, or a combination of (e), (f) or (g).

5. An apparatus for controlling a continuously variable transmission according to claim 2, wherein said means for changing the upper and lower limits of the predetermined targeted range of engine speeds sets a value of an increment of change in size of the predetermined targeted range wherein the value of the increment is larger for larger requests for stabilization.

6. An apparatus for controlling a continuously variable transmission according to claim 1, wherein said means for setting initial upper and lower limits is controlled by values of requests for change and by values of requests for stabilization so that the size of the predetermined targeted range of engine speeds is smaller for larger requests for change and is larger for larger requests for stabilization.

7. An apparatus for controlling a continuously variable transmission according to claim 6, wherein said means for changing the upper and lower limits of the predetermined targeted range of engine speeds sets a value for an increment of change in the size of the predetermined targeted range on the basis of any of (a) a change in a running state of said vehicle, (b) an unchanged duration of an input signal concerning said vehicle, and (c) a variable determined by a manually set signal, or a combination of (a), (b) or (c).

8. An apparatus for controlling a continuously variable transmission according to claim 6, wherein said means for changing the upper and lower limits of the predetermined targeted range of engine speeds sets a value of an increment of change in size of the predetermined targeted range wherein the value of the increment is larger for larger requests for stabilization.

9. An apparatus for controlling a continuously variable transmission according to claim 1, wherein said means for changing the upper and lower limits of the predetermined targeted range of engine speeds sets a value for an increment of change in the size of the predetermined targeted range on the basis of any of (a) a change in a running state of said vehicle, (b) an unchanged duration of an input signal concerning said vehicle, and (c) a variable determined by a manually set signal, or a combination of (a), (b) or (c).

10. An apparatus for controlling a continuously variable transmission according to claim 9, wherein said means for changing the upper and lower limits of the predetermined targeted range of engine speeds sets a value of an increment of change in size of the predetermined targeted range wherein the value of the increment is larger for larger requests for stabilization.

11. An apparatus for controlling a continuously variable transmission according to claim 1, wherein said means for changing the upper and lower limits of the predetermined targeted range of engine speeds sets a value of an increment of change in size of the predetermined targeted range wherein the value of the increment is larger for larger requests for stabilization.

* * * * *

UNITED STATES PATENT AND TRADEMARK OFFICE
CERTIFICATE OF CORRECTION

PATENT NO. : 5,161,433

DATED : November 10, 1992

INVENTOR(S) : SAKAKIBARA et al

It is certified that error appears in the above-identified patent and that said Letters Patent is hereby corrected as shown below:

Col. 1, line 9, delete "to a";

line 26, before "a time" insert --where--.

Col. 4, line 34, delete "starter".

Col. 5, line 35, delete "mounting" and insert --mounted--.

Col. 6, line 13, after "belt 43" insert a comma --,--.

Col. 8, line 44, delete "characteristic" and insert --characteristics--.

Col. 11, line 22, delete "chang" and insert --change--.

Col. 13, line 32, delete "$T^*_{max}=N^*_{max}{}^{x\alpha/v}$" and insert --$T^*_{max} = N^*_{max} \times \alpha/V$--;

UNITED STATES PATENT AND TRADEMARK OFFICE
CERTIFICATE OF CORRECTION

PATENT NO. : 5,161,433
DATED : November 10, 1992
INVENTOR(S) : SAKAKIBARA et al

It is certified that error appears in the above-identified patent and that said Letters Patent is hereby corrected as shown below:

line 34, delete "$T^*_{min} = N^*_{min} \times \alpha/V$" and insert

--$T^*_{min} = N^*_{min} \times \alpha/V$--.

Col. 14, line 2, delete "between", first instance, and insert

--of--.

Col. 15, line 18, delete "$N^*_{max}, N^*_{min}$" and insert

--$(N^*_{max}, N^*_{min})$--.

Col. 16, line 60, delete "$(\mathring{V}, etc.)$" and insert --$(V, \mathring{V}, etc.)$--.

UNITED STATES PATENT AND TRADEMARK OFFICE
CERTIFICATE OF CORRECTION

PATENT NO. : 5,161,433
DATED : November 10, 1992
INVENTOR(S) : SAKAKIBARA et al

It is certified that error appears in the above-indentified patent and that said Letters Patent is hereby corrected as shown below:

Col. 19, line 1, delete "do" and insert --to--;

line 32, delete "(a)" and after "one of" insert --(a)--.

Signed and Sealed this

Fourth Day of January, 1994

Attest:

BRUCE LEHMAN

Attesting Officer

Commissioner of Patents and Trademarks